United States Patent
Nagai

(10) Patent No.: US 11,221,409 B2
(45) Date of Patent: Jan. 11, 2022

(54) UNDERWATER DETECTION APPARATUS AND UNDERWATER DETECTION METHOD

(71) Applicant: FURUNO ELECTRIC CO., LTD., Nishinomiya (JP)

(72) Inventor: Sanae Nagai, Nishinomiya (JP)

(73) Assignee: FURUNO ELECTRIC COMPANY LIMITED, Nishinomiya (JP)

(*) Notice: Subject to any disclaimer, the term of this patent is extended or adjusted under 35 U.S.C. 154(b) by 208 days.

(21) Appl. No.: 16/460,796

(22) Filed: Jul. 2, 2019

(65) Prior Publication Data
US 2020/0018851 A1    Jan. 16, 2020

(30) Foreign Application Priority Data

Jul. 12, 2018 (JP) .............................. JP2018-132328

(51) Int. Cl.
| | |
|---|---|
| *G01S 15/96* | (2006.01) |
| *G01S 7/523* | (2006.01) |
| *G01S 7/62* | (2006.01) |
| *G01S 15/89* | (2006.01) |
| *A01K 79/00* | (2006.01) |

(52) U.S. Cl.
CPC .............. *G01S 15/96* (2013.01); *G01S 7/523* (2013.01); *G01S 7/6245* (2013.01); *G01S 15/8993* (2013.01); *A01K 79/00* (2013.01)

(58) Field of Classification Search
CPC ........ G01S 15/96; G01S 7/523; G01S 7/6245; G01S 15/8993; A01K 79/00
See application file for complete search history.

(56) References Cited

U.S. PATENT DOCUMENTS

| | | | | |
|---|---|---|---|---|
| 4,288,866 A | * | 9/1981 | Sackman | ............ G01S 15/8959 367/11 |
| 5,184,330 A | * | 2/1993 | Adams | .................... G01S 7/526 367/111 |
| 6,628,569 B1 | * | 9/2003 | Steiner | .................... G01S 15/96 367/111 |

(Continued)

FOREIGN PATENT DOCUMENTS

| | | | |
|---|---|---|---|
| GB | 2421312 B | 8/2008 | |
| GB | 2553404 A | * 3/2018 | ............. G01S 15/96 |

(Continued)

*Primary Examiner* — Isam A Alsomiri
*Assistant Examiner* — Vikas Atmakuri
(74) *Attorney, Agent, or Firm* — Studebaker & Brackett PC

(57) ABSTRACT

An underwater detection apparatus is provided, which may include a transmission transducer, a reception transducer, and processing circuitry. The transmission transducer may transmit a transmission wave in an underwater transmission space. The reception transducer may include a plurality of reception elements, each reception element generating a reception signal based on a reflection wave comprising a reflection of the transmission wave on an underwater target. The processing circuitry may perform beamforming in each of a plurality of reception spaces based on the reception signals, generate a 3D image data of the target based on the beamforming performed in each reception space, and extract a contour of the target detected in at least one of the reception spaces, and generate a contour image data to be displayed along with the 3D image data on a display unit.

19 Claims, 15 Drawing Sheets

(56) References Cited

U.S. PATENT DOCUMENTS

| | | | |
|---|---|---|---|
| 6,870,793 B2 | 3/2005 | Ishihara et al. | |
| 9,857,464 B2* | 1/2018 | Kozuki | G01S 15/06 |
| 9,880,274 B2* | 1/2018 | Shiraki | G01S 7/539 |
| 10,024,957 B2* | 7/2018 | Horner | G01S 7/526 |
| 2003/0030636 A1* | 2/2003 | Yamaoka | H04N 5/247 |
| | | | 345/419 |
| 2004/0027919 A1* | 2/2004 | Erikson | G01V 1/38 |
| | | | 367/88 |
| 2006/0072375 A1 | 4/2006 | Nishimori et al. | |
| 2006/0123050 A1* | 6/2006 | Carmichael | G06K 9/00885 |
| 2008/0031092 A1 | 2/2008 | Iida et al. | |
| 2008/0043572 A1* | 2/2008 | Hansen | G06T 17/05 |
| | | | 367/11 |
| 2009/0132170 A1* | 5/2009 | Krueger | G01V 1/34 |
| | | | 702/16 |
| 2011/0074766 A1* | 3/2011 | Page | G06T 17/05 |
| | | | 345/419 |
| 2012/0281503 A1* | 11/2012 | Rikoski | G01S 15/89 |
| | | | 367/88 |
| 2014/0032479 A1* | 1/2014 | Lauenstein | G01S 15/89 |
| | | | 707/602 |
| 2014/0306579 A1* | 10/2014 | Weber | B06B 1/06 |
| | | | 310/337 |
| 2014/0328141 A1* | 11/2014 | Rikoski | G01S 15/588 |
| | | | 367/91 |
| 2015/0359512 A1* | 12/2015 | Boctor | A61B 8/469 |
| | | | 600/444 |
| 2016/0011310 A1* | 1/2016 | Horner | G06T 7/143 |
| | | | 345/419 |
| 2016/0018515 A1* | 1/2016 | Brown | G01S 7/52003 |
| | | | 367/11 |
| 2016/0131759 A1* | 5/2016 | Kozuki | G10K 11/352 |
| | | | 367/102 |
| 2016/0131760 A1* | 5/2016 | Kozuki | G01S 15/34 |
| | | | 367/102 |
| 2016/0210534 A1* | 7/2016 | Padubrin | G06K 9/6256 |
| 2016/0249036 A1* | 8/2016 | Son | H04N 13/254 |
| 2016/0267675 A1* | 9/2016 | Du | G06T 7/13 |
| 2016/0286182 A1* | 9/2016 | Reddy | G03B 21/608 |
| 2016/0377716 A1* | 12/2016 | Proctor | G01S 15/89 |
| | | | 367/88 |
| 2017/0097415 A1* | 4/2017 | Shiraki | G01S 13/88 |
| 2017/0097416 A1* | 4/2017 | Shiraki | G01S 15/96 |
| 2017/0227639 A1* | 8/2017 | Stokes | G01S 7/6272 |
| 2018/0074195 A1* | 3/2018 | Wiegers | G01S 7/6272 |
| 2018/0164434 A1* | 6/2018 | Stokes | G01S 7/6218 |
| 2018/0165870 A1* | 6/2018 | Stokes | G06T 15/08 |
| 2018/0231647 A1* | 8/2018 | Fabrizio | G01S 15/89 |
| 2018/0232599 A1* | 8/2018 | Padubrin | G06N 7/005 |
| 2018/0260995 A1* | 9/2018 | Steen | G01S 7/52068 |
| 2018/0279596 A1* | 10/2018 | Burton | G01S 15/96 |
| 2018/0313651 A1* | 11/2018 | Laine | G01S 19/45 |

FOREIGN PATENT DOCUMENTS

| | | |
|---|---|---|
| JP | 3924274 B2 | 6/2007 |
| JP | 2008268183 A | 11/2008 |
| JP | 5089319 B2 | 12/2012 |

\* cited by examiner

UNDERWATER DETECTION APPARATUS AND UNDERWATER DETECTION METHOD

CROSS-REFERENCE TO RELATED APPLICATION(S)

This application claims priority under 35 U.S.C. § 119 to Japanese Patent Application No. 2018-132328, which was filed on Jul. 12, 2018, the entire disclosure of which is hereby incorporated by reference.

TECHNICAL FIELD

The present disclosure relates to an underwater detection apparatus and an underwater detection method which detect an underwater target object.

BACKGROUND

An underwater detection apparatus (sonar) which transmits underwater an ultrasonic beam as a transmission wave to scan a three-dimensional area, and generates data for displaying underwater information in the scanned area as a three-dimensional image based on the received reflection wave is known.

This underwater detection apparatus generates, as the underwater information, data of the three-dimensional image of underwater target objects, such as schools of fish, and based on this data, displays on a display unit the target object by the three-dimensional image.

According to the underwater detection apparatus, the target objects, such as the underwater schools of fish, are displayed on the display unit by the three-dimensional image. However, when the target objects are displayed on the display unit by the three-dimensional image, the three-dimensional image of the target objects is displayed so as to be projected to a two-dimensional screen of the display unit. For this reason, it tends to be difficult for a user to distinguish the target objects one from another individually in the three-dimensional image.

SUMMARY

The purpose of the present disclosure relates to provide an underwater detection apparatus and an underwater detection method, which allow a user to easily distinguish target objects displayed in a three-dimensional image one from another individually.

According to one aspect of the present disclosure, an underwater detection apparatus is provided, which may include a transmission transducer, a reception transducer, and processing circuitry. The transmission transducer may transmit a transmission wave in an underwater transmission space. The reception transducer may include a plurality of reception elements, each reception element generating a reception signal based on a reflection wave comprising a reflection of the transmission wave on an underwater target. The processing circuitry may perform beamforming in each of a plurality of reception spaces based on the reception signals, generate a 3D image data of the target based on the beamforming performed in each reception space, and extract a contour of the target detected in at least one of the reception spaces, and generate a contour image data to be displayed along with the 3D image data on a display unit.

When a first contour is extracted as the contour of the target detected in a first reception space of the plurality of reception spaces, if the target is also detected in a second reception space of the plurality of reception spaces adjacent to the first reception space, the processing circuitry may extract a second contour as the contour of the target detected in the second reception space, and generate the contour image data of the first and second contours to be displayed on the display unit. The processing circuitry may repeat the first contour extraction followed by the second contour extraction process until the target is not detected any more in the second reception space adjacent to the first reception space in which the contour has been extracted.

According to another aspect of the present disclosure, an underwater detection method may include transmitting a transmission wave in an underwater transmission space, generating from each reception element of a plurality of reception elements a reception signal based on a reflection wave comprising a reflection of the transmission wave on an underwater target, performing beamforming in each of a plurality of reception spaces based on the reception signals, generating a 3D image data of the target based on the beamforming performed in each reception space, and extracting a contour of the target detected in at least one of the reception spaces, and generating a contour image data to be displayed along with the 3D image data on a display unit.

According to the present disclosure, the underwater detection apparatus and the underwater detection method are provided, which allow a user to easily distinguish the target objects one from another, displayed by the three-dimensional image, and to easily recognize the target object.

BRIEF DESCRIPTION OF DRAWINGS

The present disclosure is illustrated by way of example and not by way of limitation in the figures of the accompanying drawings, in which like reference numerals indicate like elements and in which.

DETAILED DESCRIPTION

Hereinafter, an underwater detection apparatus 1 according to one embodiment of the present disclosure is described with reference to the accompanying drawings.

[Entire Configuration of Underwater Detection Apparatus]

Figure 1:
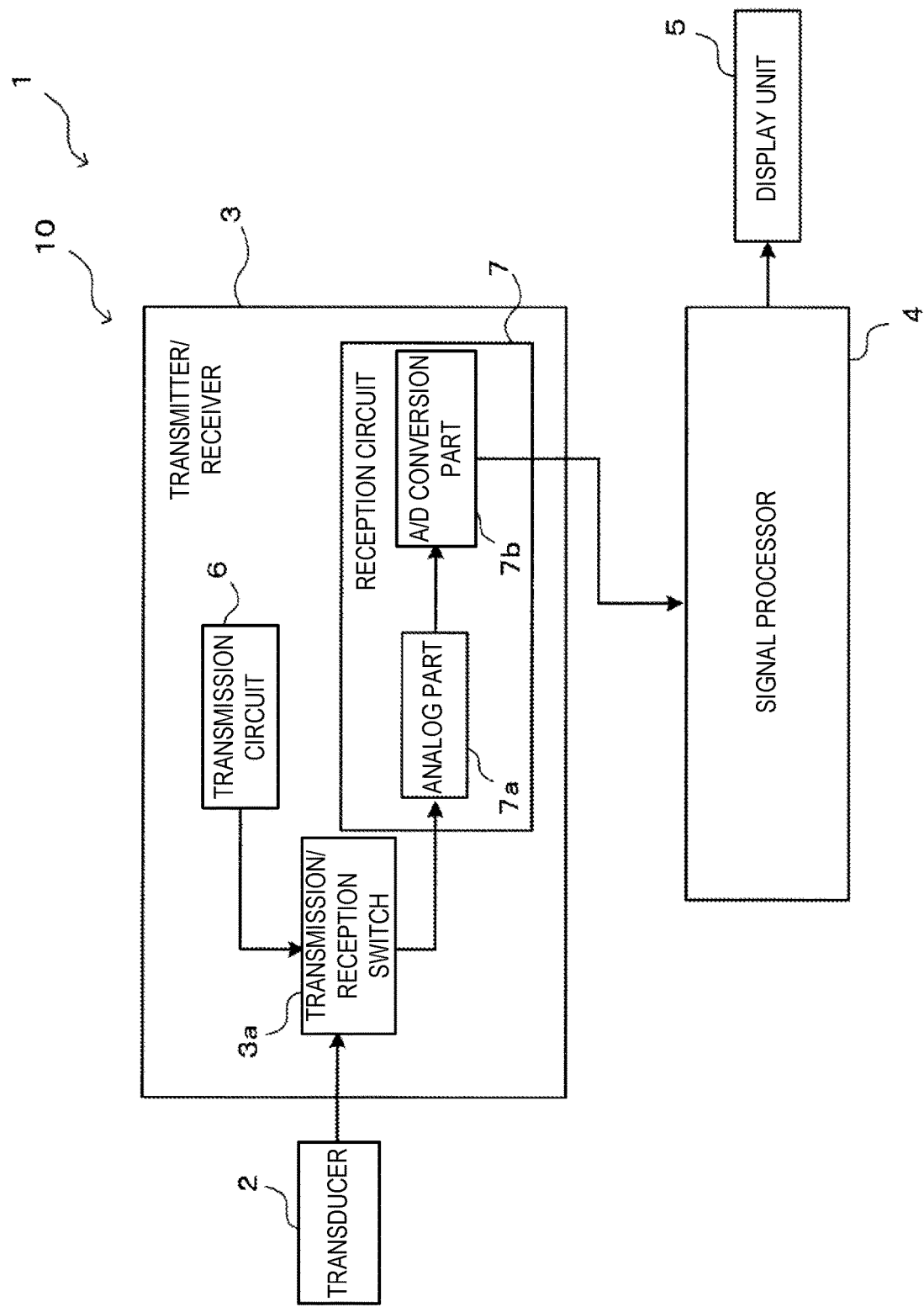
FIG. 1 is a block diagram illustrating a configuration of an underwater detection apparatus according to one embodiment of the present disclosure.

FIG. 1 is a block diagram illustrating a configuration of the underwater detection apparatus 1 according to this embodiment of the present disclosure. The underwater detection apparatus 1 is provided to, for example, a ship, such as a fishing boat. Below, the ship provided with the underwater detection apparatus 1 is referred to as "the ship" to be distinguished from other ships. Note that the present disclosure may be applied to ships which typically travel on water or sea which are referred to as surface ships, and may also be applied to other types of ships including boats, dinghies, watercrafts, and vessels. Further, the present disclosure may also be applied, if applicable, to submarines.

As illustrated in FIG. 1, the underwater detection apparatus 1 may be provided with a scanning sonar 10 and a signal processor 4. The underwater detection apparatus 1 may have a configuration in which, for example, the signal processor 4 is provided externally to the generally-known scanning sonar 10. Alternatively, the underwater detection apparatus 1 may have a configuration in which the signal processor 4 is mounted on the scanning sonar 10. Moreover, a display unit 5 constituted as a display device may also be provided externally to the underwater detection apparatus 1. The display unit 5 may be connected to the signal processor 4.

The scanning sonar 10 may be provided with a transducer 2 (which may also be referred to as a transmission transducer and/or a reception transducer) and a transmitter/receiver 3.

[Configuration of Transducer]

The transducer 2 may have a function to transmit and receive an ultrasonic wave, and may be attached to the bottom of the ship. For example, the transducer 2 is formed in a substantially spherical shape.

In detail, the transducer 2 may have a substantially spherical-shaped casing, and an ultrasonic transducer (not illustrated) as a plurality of transducer elements (which may also be referred to as transmission elements and/or reception elements) attached to an outer circumferential surface of the casing. The ultrasonic transducer may transmit an ultrasonic wave to an underwater transmission space as a transmission wave, receive a reflection wave (echo) including a reflection of the transmission wave at a target object, such as an underwater school of fish, convert the reflection wave into an electrical signal to generate a reception signal, and output it to the transmitter/receiver 3. That is, the transducer 2 may be constituted as a transmitting transducer which transmits the transmission wave to the underwater transmission space, and may also be constituted as a receiving transducer having a plurality of receiving elements, each generating the reception signal based on the reflection wave including the reflection of the transmission wave on the underwater target (target object). Note that, in this embodiment, although the casing of the transducer 2 has the spherical shape, it may have other shapes, such as a substantially cylindrical shape. If the casing of the transducer 2 is of the substantially cylindrical shape, the transducer 2 may be disposed so that its axial direction is oriented vertically and its radial direction is oriented horizontally.

Figure 2:
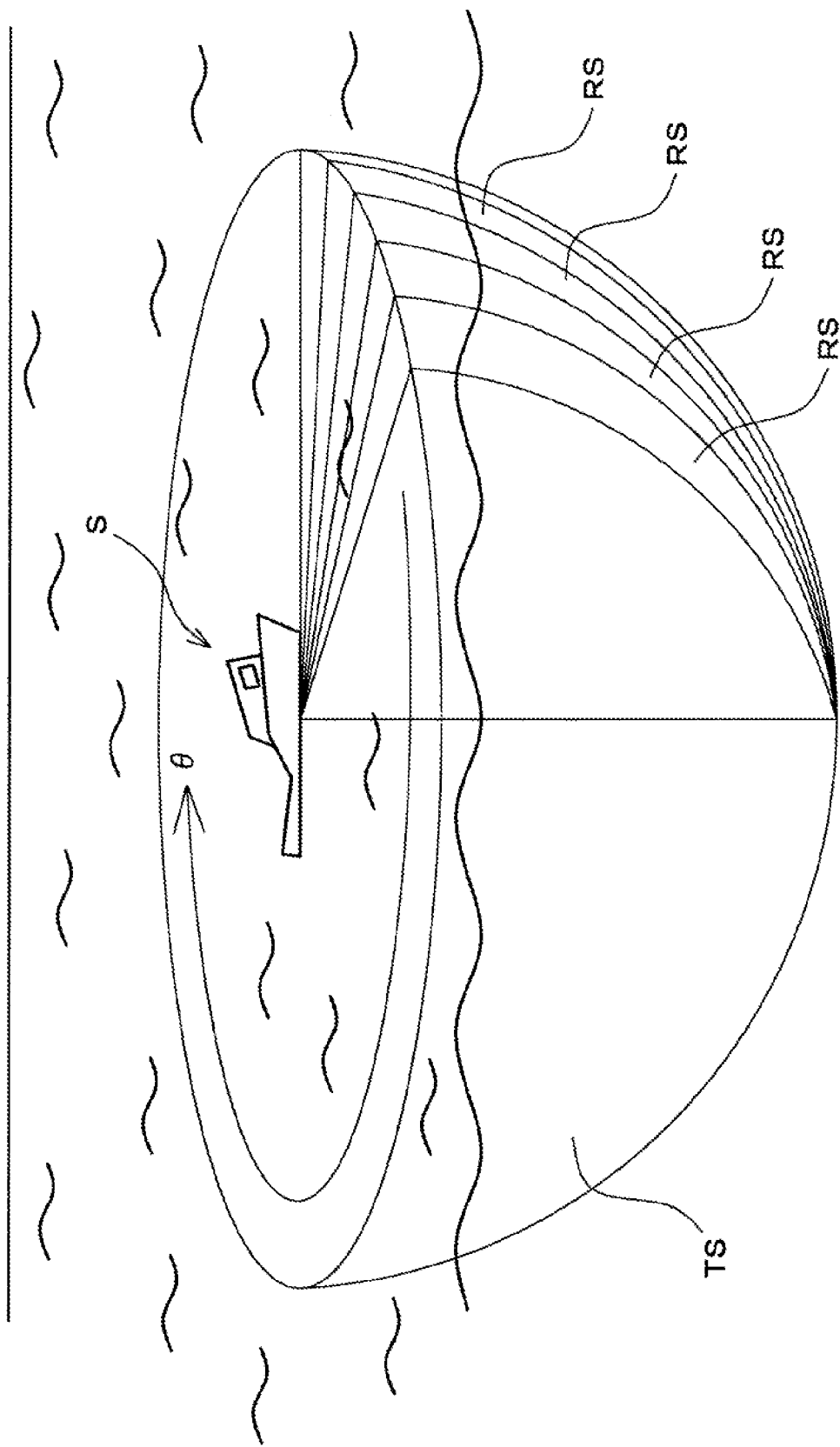
FIG. 2 is a view schematically illustrating a transmission space to which transmission waves are transmitted from a transducer, and a plurality of reception spaces where reflection waves are received by the transducer, respectively.

FIG. 2 is a view schematically illustrating a transmission space TS to which transmission waves are transmitted from the transducer 2, and a plurality of reception spaces RS where reflection waves are received by the transducer 2, respectively. The transmission waves transmitted from the transducer 2 mounted on the ship S may be transmitted all at once towards all the underwater directions centering on the ship S from the transducer 2, for example, a hemispherical transmission beam is formed. When the hemispherical transmission beam is formed, the transmission space TS to which the transmission waves are transmitted may be constituted as a hemispherical space. Note that the shape of the transmission beam is not limited to the hemispherical shape, but may be formed in various different shapes according to the shape of the transducer 2, or amplitude and phase of an electrical signal which are inputted into each transducer element of the transducer 2.

Moreover, the transducer 2 may form a plurality of reception beams to scan in the circumferential direction (in the direction of an azimuth angle θ indicated by an arrow in FIG. 2) all at once within the transmission space TS after the transmission of the transmission beam. That is, all the reception beams may be formed at one reception timing of the transducer 2. Then, each of the plurality of reception spaces RS where the reflection wave reflected on a target object, such as an underwater school of fish, is received (i.e., each space in which the reception beam is formed) may be constituted as a partial space (subspace) of the transmission space TS, may be formed so as to spread in a fan shape in the vertical direction, and may be widened in the horizontal direction, as it separates from the transducer 2. Moreover, the reception spaces RS may be arranged in the circumferential direction of the transmission space TS (i.e., in the direction of the azimuth angle θ). Therefore, in this embodiment, one reception space RS and another reception space RS may cover different azimuth angle ranges.

[Configuration of Transmitter/Receiver]

The transmitter/receiver 3 may include a transmission/reception switch 3a, a transmission circuit 6, and a reception circuit 7.

The transmission/reception switch 3a may be to switch between transmission and reception of the signal from/to the transducer 2. In detail, when transmitting to the transducer 2 a drive signal for causing the transducer 2 to drive, the transmission/reception switch 3a may output to the transducer 2 the drive signal outputted from the transmission circuit 6. On the other hand, when the reception signal is received from the transducer 2, the transmission/reception switch 3a may output to the reception circuit 7 the reception signal received from the transducer 2.

The transmission circuit 6 may generate the drive signal used as the basis of the transmission wave to be transmitted from the transducer 2. In more detail, the transmission circuit 6 may have a transmitting circuit (not illustrated) provided corresponding to each ultrasonic transducer, and each transmitting circuit may generate the drive signal.

The reception circuit 7 may have an analog part 7a and an A/D conversion part 7b. The analog part 7a and the A/D conversion part 7b may have a receiving circuit (not illustrated) which is provided corresponding to each ultrasonic transducer, and processes the reception signal generated based on the reflection wave of the transmission wave. Then, the analog part 7a may amplify the reception signal as an electrical signal which is generated based on the reflection wave of the transmission wave and outputted by the transducer 2, and remove unnecessary frequency components by regulating the frequency band of the reception signal. The A/D conversion part 7b may convert the amplified reception signal into the reception signal as a digital signal. Then, the reception circuit 7 may output the converted digital reception signal to the signal processor 4.

[Configuration of Display Unit]

The display unit 5 may be constituted as a display device. The display unit 5 may display on a display screen an image according to image data outputted from the signal processor 4. In this embodiment, the display unit 5 may display an underwater state below the ship three-dimensionally as a bird's-eye view. Therefore, a user of the underwater detection apparatus 1 can guess the underwater state below the ship (e.g., the existence and the positions of schools of fish, irregularity of the seabed, and structures such as artificial fish reefs), while looking at the display screen.

[Entire Configuration of Signal Processor]

Figure 3:
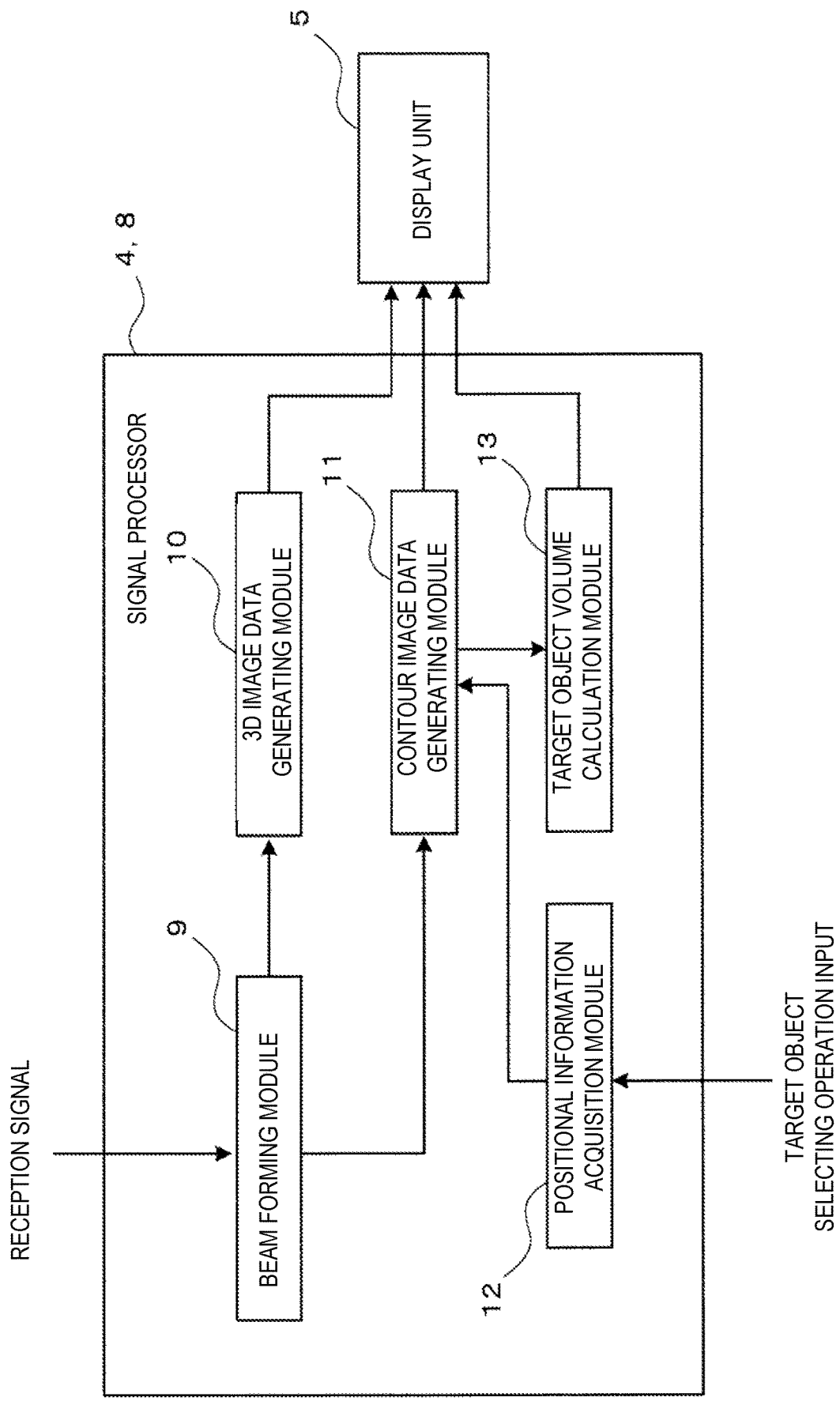
FIG. 3 is a block diagram illustrating a configuration of a signal processor of the underwater detection apparatus.

FIG. 3 is a block diagram illustrating a configuration of the signal processor 4. Referring to FIGS. 1 and 3, the signal processor 4 may process the reception signal outputted from the reception circuit 7 to perform beam forming processing, and perform processing to generate image data of a target object and an outline or contour of the target object.

The signal processor 4 may include a beam forming module 9, a three-dimensional (3D) image data generating module 10, a contour image data generating module 11, a positional information acquisition module 12, and a target object volume calculation module 13.

The signal processor 4 may be an apparatus connected with the transmitter/receiver 3 of the scanning sonar 10 through cables, and is comprised of, for example, a personal computer (PC). The signal processor 4 may include devices, such as a hardware processor (which may also be referred to as processing circuitry) 8 (e.g., a CPU, a FPGA, etc.) and a nonvolatile memory. The hardware processor 8 may function as the beam forming module 9, the three-dimensional image data generating module 10, the contour image data generating module 11, the positional information acquisition module 12, and the target object volume calculation module 13, which will be described in detail below. For example, by the CPU reading a program from the nonvolatile memory and executing the program, the hardware processor 8 functions as the beam forming module 9, the three-dimensional image data generating module 10, the contour image data generating module 11, the positional information acquisition module 12, and the target object volume calculation module 13.

[Configuration of Beam Forming Module]

The beam forming module 9 may perform the beam forming processing (in detail, summing phase shifted signals) for each of the plurality of reception spaces RS based on the reception signal received from the reception circuit 7. Note that the beam forming module 9 may generate, in this beam forming processing, a reception beam signal which is a signal equivalent to what is obtained by the single ultrasonic transducer having a sharp directivity in a particular direction. Then, the beam forming module 9 may repeat this processing while changing the ultrasonic transducer used for performing the beam forming processing to generate a large number of reception beam signals having directivities in all directions corresponding to the respective reception spaces RS. Further, the beam forming module 9 may perform filtering processing of a bandlimiting filter or a pulse-compression filter to each of the reception beams formed corresponding to the reception spaces RS and detect an echo signal of the target object when a signal intensity level of the echo signal exceeds a given threshold.

[Configuration of Three-Dimensional Image Data Generating Module]

Figure 4:
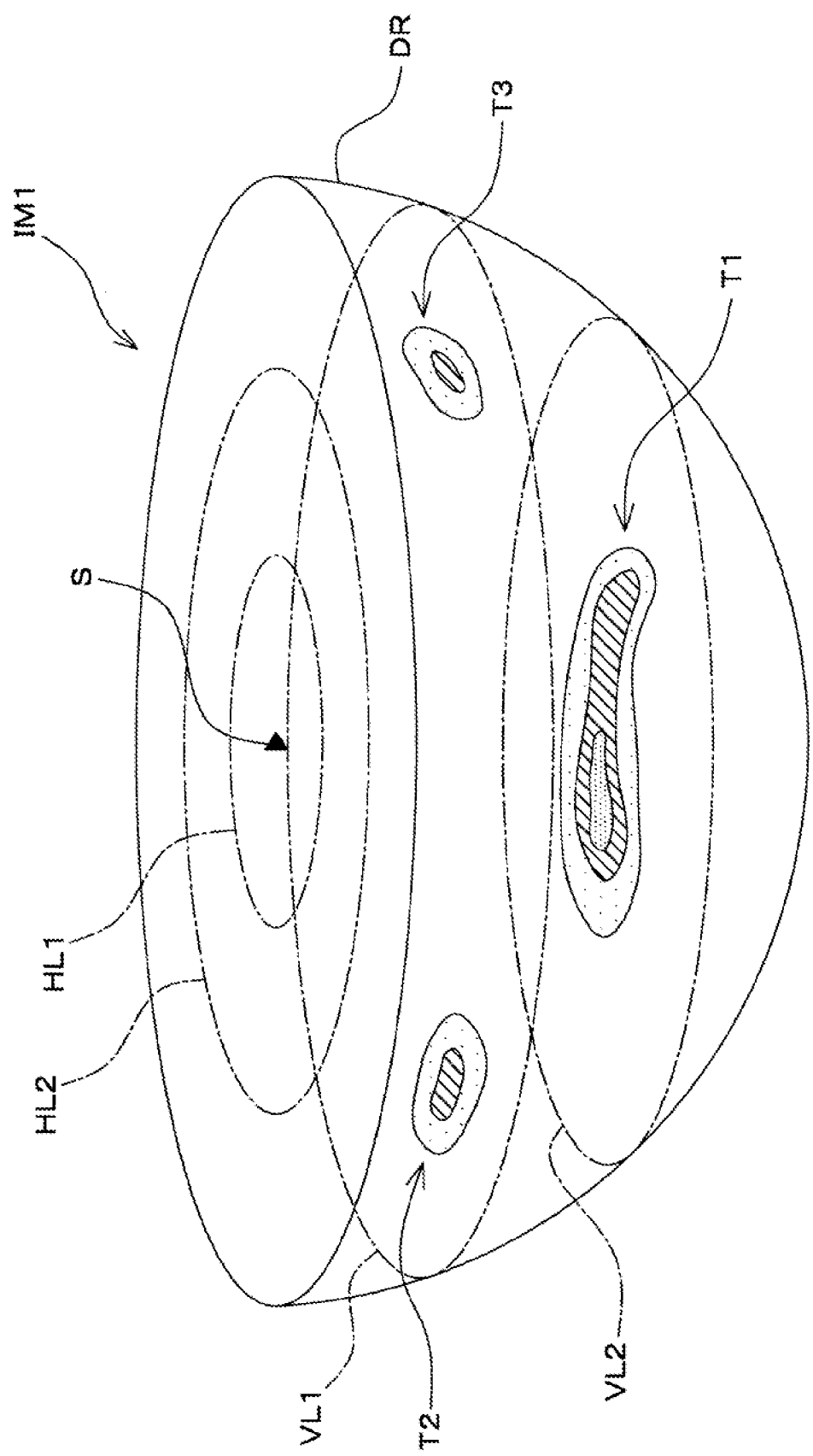
FIG. 4 is a view schematically illustrating one example of an image displayed on a display screen of a display unit.

The three-dimensional image data generating module 10 may generate a three-dimensional image data of the target object for displaying the target object on the display unit 5 based on the results of the beam forming processing and the filtering processing performed for the respective reception spaces RS. Note that the three-dimensional image data generating module 10 may generate the three-dimensional image data of the target object by performing isosurface processing (i.e., surface rendering processing) or volume rendering processing based on the results of the beam forming processing and the filtering processing. The three-dimensional image data generated by the three-dimensional image data generating module 10 may be outputted to the display unit 5, and displayed on the display screen of the display unit 5. FIG. 4 is a view schematically illustrating one example of the image displayed on the display screen of the display unit 5. Note that, in FIG. 4, a three-dimensional image IM1 displayed on the display screen based on the three-dimensional image data generated by the three-dimensional image data generating module 10 is illustrated.

As illustrated in FIG. 4, in the three-dimensional image IM1, the three-dimensional image of the target objects (T1, T2, and T3) of which echo signals are detected in an underwater detection area DR corresponding to the transmission space TS may be displayed. Note that, the three-dimensional image IM1 may be displayed in a state where it is projected to a two-dimensional display screen of the display unit 5. Moreover, the three-dimensional image of the target objects (T1, T2, and T3) may be displayed as the echo images of the target objects (T1, T2, and T3). Note that, in FIG. 4, each of the target objects (T1, T2, and T3) may be indicated as a school of fish. Moreover, the indication of the three-dimensional image IM1 may also include indications of equidistance lines HL1 and HL2 which indicate equidistant positions from the ship S on the water surface, and equidepth lines VL1 and VL2 which indicate the positions of the same depths in the underwater depth direction. Note that, in FIG. 4, although a line indicative of the detection area DR is also displayed in the three-dimensional image IM1, it may not be displayed.

Note that, in the three-dimensional image IM1 in FIG. 4, an area where the reception signal with a high signal intensity level is acquired is indicated by a high-density dot-hatching area, an area where the reception signal with a moderate signal intensity level is acquired is indicated by an oblique hatching area, and an area where the reception signal with a low signal intensity level is acquired is indicated by a low-density dot-hatching area. Below, the high-density dot hatching area is referred to as a "high echo intensity area," the oblique hatching area is referred to as a "moderate echo intensity area," and the low-density dot-hatching area is referred to as a "low echo intensity area." The three-dimensional image data of the target objects generated by the three-dimensional image data generating module 10 may also include information on colors to be displayed on the display unit 5 (display colors). The high echo intensity area, the moderate echo intensity area, and the low echo intensity area may be displayed by colors based on the display color information included in the three-dimensional image data.

For example, the high echo intensity area is indicated in red, the moderate echo intensity area is in green and the low echo intensity area is in blue.

Figure 5:
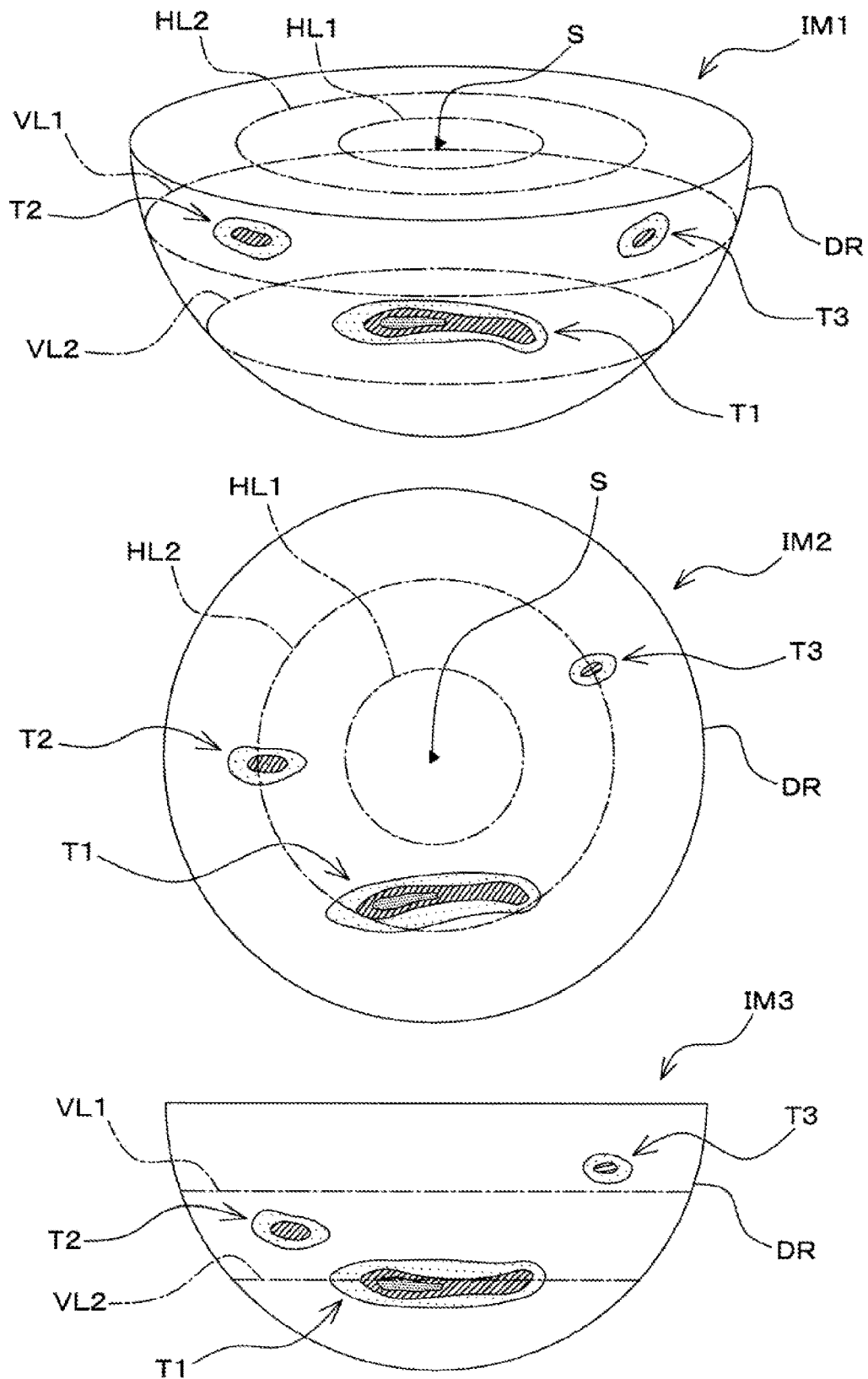
FIG. 5 is a view schematically illustrating one example of the image displayed on the display screen of the display unit.

FIG. 5 is a view schematically illustrating one example of the image displayed on the display screen of the display unit 5, which is different from the example in FIG. 4. In FIG. 5, the three-dimensional image IM1, a three-dimensional image IM2, a three-dimensional image IM3, which are displayed on the display screen based on the three-dimensional image data generated by the three-dimensional image data generating module 10, are illustrated. That is, in FIG. 5, the three three-dimensional images (IM1, IM2, and IM3) are lined up in the same display screen.

In FIG. 5, the three-dimensional image IM1 is an image of the target objects (T1, T2, and T3) viewed from a first viewpoint which is the same as the display example of FIG. 4, and the three-dimensional images (IM2 and IM3) are images of the target objects (T1, T2, and T3) viewed from a second viewpoint different from the first viewpoint. Here, the first viewpoint is set as a viewpoint where the detection area DR is viewed from obliquely above the ship S (hereinafter, this viewpoint is also referred to as an "obliquely above viewpoint"). The second viewpoint is set as a viewpoint where the detection area DR is viewed vertically from directly above the ship S (hereinafter, this viewpoint is also referred to as a "vertical viewpoint"), or as a viewpoint where the detection area DR is viewed horizontally from the sideway (hereinafter, this viewpoint is also referred to as a "horizontal viewpoint").

In FIG. 4, one three-dimensional image IM1 is displayed on the display unit 5, and in FIG. 5, three three-dimensional images (IM1, IM2, and IM3) are displayed on the same screen of the display unit 5. The three-dimensional images, such as the three-dimensional images (IM1, IM2, and IM3) displayed on the display unit 5, may be suitably switched based on operation of the user. For example, when the user suitably operates a user interface (not illustrated) provided to the underwater detection apparatus 1, such as a keyboard or a pointing device, all of the three-dimensional images (IM1, IM2, and IM3), or one or two of the three-dimensional images (IM1, IM2, and IM3) may be displayed on the display unit 5.

Note that, although in the above example, the display unit 5 sets the obliquely above viewpoint as the first viewpoint and the vertical viewpoint and the horizontal viewpoint as the second viewpoint, and then displays the three-dimensional image, the configuration may be altered. For example, the display unit 5 may set an arbitrary viewpoint other than the obliquely above viewpoint as the first viewpoint, and an arbitrary viewpoint including a cross-sectional view of the detection area DR as the second viewpoint, without being limited to the viewpoint external of the detection area DR.

[Configuration of Positional Information Acquisition Module]

The positional information acquisition module 12 may acquire target object positional information indicative of the position of a selected target object based on an input by a selecting operation of the target object by the user. In more detail, the user operates the pointing device, such as a mouse, to move the position of a cursor to a position of an arbitrary target object in the display screen. Then, the user may perform a click operation of the pointing device on the target object to select the target object. By this operation, the input of the selecting operation of the target object may be made to the signal processor 4. For example, as illustrated in FIG. 4, in the state where the three-dimensional image IM1 is displayed on the display screen, the user moves the cursor to the position of the target object T1, and performs the click operation on the target object T1. Thus, the input of the selecting operation of the target object T1 may be made to the signal processor 4.

After the input of the selected target object T1, the positional information acquisition module 12 may acquire a position in the detection area DR where the click operation is performed by the user as target object positional information indicative of the position of the selected target object T1. The target object positional information may be three-dimensional coordinates of the clicked position in the detection area DR, which is the coordinates of the data of the echo signal located nearest to the viewer of the currently-displayed three-dimensional image.

[Configuration of Contour Image Data Generating Module]

The contour image data generating module 11 may extract a contour of the target object of which the echo signal is detected in at least one reception space RS, and generate contour image data for displaying the contour on the display unit 5. Moreover, the contour image data generating module 11 may extract the contour of the target object including the position corresponding to the target object positional information acquired by the positional information acquisition module 12, and generate the contour image data. Below, a configuration of the contour image data generating module 11 is described in more detail.

Figure 6:
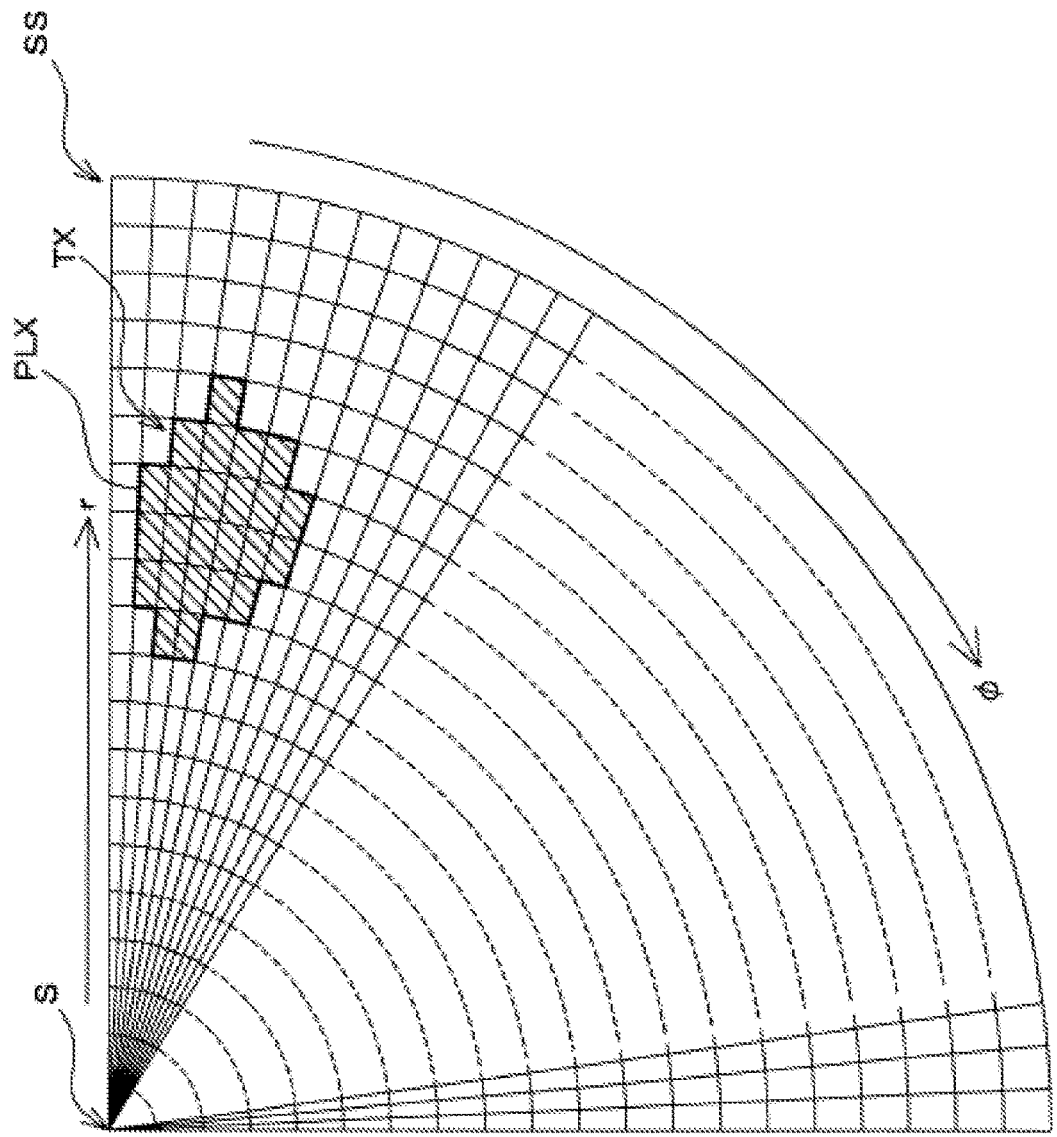
FIG. 6 is a view schematically illustrating slice planes set corresponding to the respective reception spaces, and a target object of which an echo signal is detected in the slice planes.

The contour image data generating module 11 may extract the contour of the target object for each slice plane SS set corresponding to the corresponding reception space RS. FIG. 6 is a view schematically illustrating one slice plane SS set corresponding to one arbitrary reception space RS, and a target object TX of which the echo signal is detected in the slice plane SS. Each slice plane SS may be set as a fan-shaped plane which spreads in a direction of a distance r from the position of the ship S, and a direction of a tilt angle φ (i.e., an angle of depression) from the position of the ship S with respect to the horizontal plane. When performing the beam forming processing and the filtering processing for each reception space RS, the beam forming module 9 may detect the echo signal of the target object at sampling points dispersed at an equidistance interval in the direction of the distance r and an equiangle interval in the direction of the tilt angle φ, in each slice plane SS corresponding to the corresponding reception space RS. In FIG. 6, the areas corresponding to the respective sampling points are schematically illustrated as cell-like areas arranged in the direction of the distance r and the direction of the tilt angle φ. Note that, in FIG. 6, the illustrated sampling points are dispersed at a coarse interval, rather than the actual interval, in order to facilitate the understandings.

When the positional information acquisition module 12 acquires the target object positional information, the contour image data generating module 11 may specify the slice plane SS nearest to the coordinates in the detection area DR based on the target object positional information. Then, the contour image data generating module 11 may specify the sampling point nearest to the coordinates specified by the target object positional information, on the specified slice plane SS to acquire the coordinates of the sampling point.

Further, the contour image data generating module 11 may perform binary coded processing and the expansion and contraction processings to data of all the echo signals in the slice plane SS nearest to the coordinates of the target object positional information. The binary coded processing, and the expansion and contraction processings are performed based on the known technique, for example, disclosed in JP2008-268183A, which is incorporated herein by reference.

In detail, in the binary coded processing, the signal intensity level of each echo signal may be compared with a given threshold, and if the signal intensity level is above the threshold, "1" is assigned, and on the other hand, if the signal intensity level is below the threshold, "0" is assigned. Thus, the binary coded processing may be applied to the data of all the echo signals in the slice plane SS concerned. Note that the given threshold is set, for example, based on input operation by the user.

Moreover, in the expansion processing of the expansion and contraction processings, if a certain observing pixel data in an observing slice plane SS or nearby pixel data has at least one "1," the observing pixel data is set to "1." Then, in the contraction processing of the expansion and contraction processings, if a certain observing pixel data in an observing slice plane SS or nearby pixel data has at least one "0," the observing pixel data may be set to "0." By performing the expansion and contraction processings, a "hole" in the binary-coded image (i.e., the pixel data of "0" surrounded by the pixel data of "1") may disappear.

After the binary coded processing and the expansion and contraction processings are performed in the observing slice plane SS, if any echo signal of the target object is detected in the slice plane SS, the data of a bunch of echo signals may be obtained in the slice plane SS as the echo signals of the target object. In FIG. 6, the data of the bunch of echo signals acquired as an echo image of the target object TX is schematically illustrated.

The contour image data generating module 11 may then perform labeling processing to the echo image of the target object TX. In the labeling processing, an ID number may be assigned to the echo image of the target object TX. For example, in the example of FIG. 6, if the echo image of the target object TX is an echo image to which the labeling processing is performed first, the ID number of "No. 1" is assigned to or associated with the echo image of the target object TX.

The contour image data generating module 11 may then perform contour extraction processing of the target object TX with the ID number. In the contour extraction processing, data of a contour along an outer edge of the echo image of the target object TX with the ID number (hereinafter, may also be referred to as the "labeled target object") may be extracted. In FIG. 6, a contour PLX of the echo image of the labeled target object TX is extracted. In FIG. 6, since the sampling points in the slice plane SS are located at the coarse interval as described above, the roughness of the contour PLX is illustrated largely more than the actual case.

Then, the contour image data generating module 11 may generate the contour image data for displaying the extracted contour of the target object TX on the display unit 5. Note that the contour image data may include display color information. The contour image data generating module 11 may set display color information of the contour image data differently from display color information of the three-dimensional image data of the target object TX. That is, the contour image data generating module 11 may set a display color of the contour differently from a display color of the target object TX. For example, if the display colors of the target object TX are red, green, and blue, the display color of the contour of the target object TX is set in white.

Then, the contour image data generating module 11 may also perform the processing to generate the contour image data for an adjacent slice plane SS. Thus, the contour image data generating module 11 may repeatedly perform the above processing to generate the contour image data for an adjacent slice plane SS until the echo signal of the target object is no longer detected in the adjacent slice plane SS.

That is, the contour image data generating module 11 may first extract a contour of the target object in a first reception space RS1 which is one of a plurality of reception spaces RS, as a first contour. Then, if the echo signal of the target object is detected also in a second reception space RS2 adjacent to the first reception space RS1, a contour of the target object may be extracted as a second contour. Then, contour image data for displaying the first contour and the second contour on the display unit 5 may be generated. Further, the contour image data generating module 11 may repeat the processing to extract the second contour subsequently to the extraction of the first contour until it no longer detects the echo signal of the target object in the second reception space RS2 adjacent to the first reception space RS1. That is, once the contour image data generating module 11 generates the contour image data for displaying the first contour and the second contour on the display unit 5, it may then set the second reception space RS2 as a new first reception space RS1 to repeat the above processing similarly. The processing may be repeated until the echo signal of the target object is no longer detected in a new second reception space RS2 adjacent to the new first reception space RS1.

Figure 7:
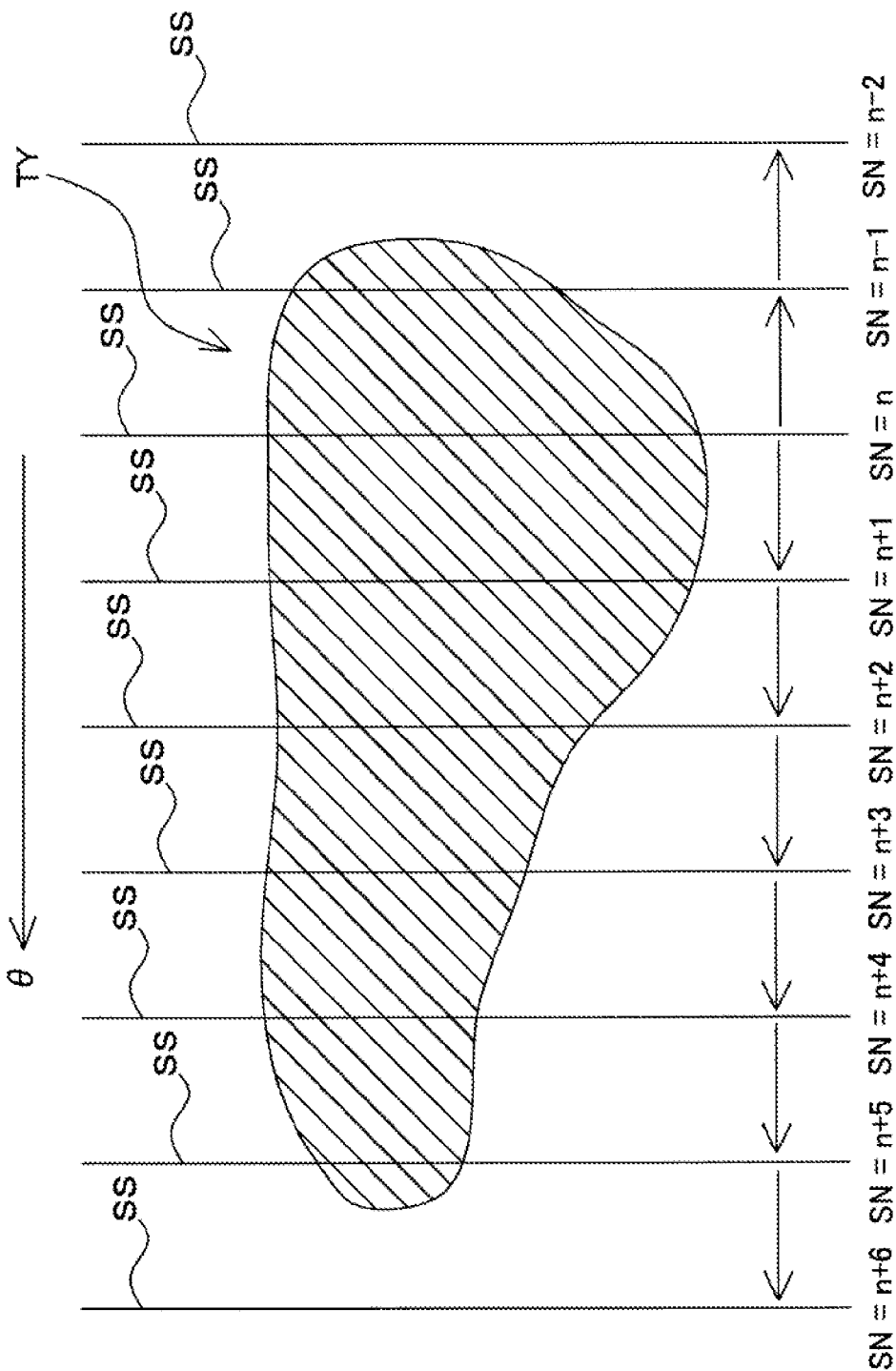
FIG. 7 is a view illustrating processing of a contour image data generating module of the signal processor.

The generating processing of the contour image data in the adjacent slice plane SS by the contour image data generating module 11 is described in more detail with reference to FIGS. 7 and 8. FIG. 7 schematically illustrates a case where an echo signal of a target object TY which exists over the plurality of reception spaces RS lined up in the direction of the azimuth angle θ is detected in the beam forming module 9. Since the echo signal of the target object TY is detected over the plurality of reception spaces RS, the echo signals of the target object TY may be detected also in the plurality of slice planes SS corresponding to the plurality of reception spaces RS, respectively. Here, in FIG. 7, slice numbers which are the numbers of the slice planes SS to identify the respective slice planes SS (hereinafter, referred to as the "slice number(s) SN") are n−2, n−1, n, n+1, n+2, n+3, n+4, n+5, and n+6, for example. The slice planes SS having the slice number SN of n−2 to n+6 may be located adjacent to each other in this order in the direction of the azimuth angle θ. Below, the processing to generate the contour image data in the adjacent slice plane SS is described for a case where the slice number SN of the slice plane SS nearest to the coordinates of the target object positional information acquired by the positional information acquisition module 12 is n, with reference to FIGS. 7 and 8.

In the example of FIG. 7, the contour image data generating module 11 may specify the slice number SN of the slice plane SS nearest to the coordinates of the target object positional information as n. That is, the contour image data generating module 11 may select the slice plane SS of the slice number SN=n as a first observing slice plane SS for the processings to extract the contour of the target object TY and generate the contour image data. Then, the contour image data generating module 11 may perform the binary coded processing, the expansion and contraction processings, the labeling processing, and the contour extraction processing to the slice plane SS of the slice number SN=n. Thus, the contour image data generating module 11 may extract the contour of the target object TY in the slice plane SS of the slice number SN=n, and then generate the contour image data.

Figure 8:
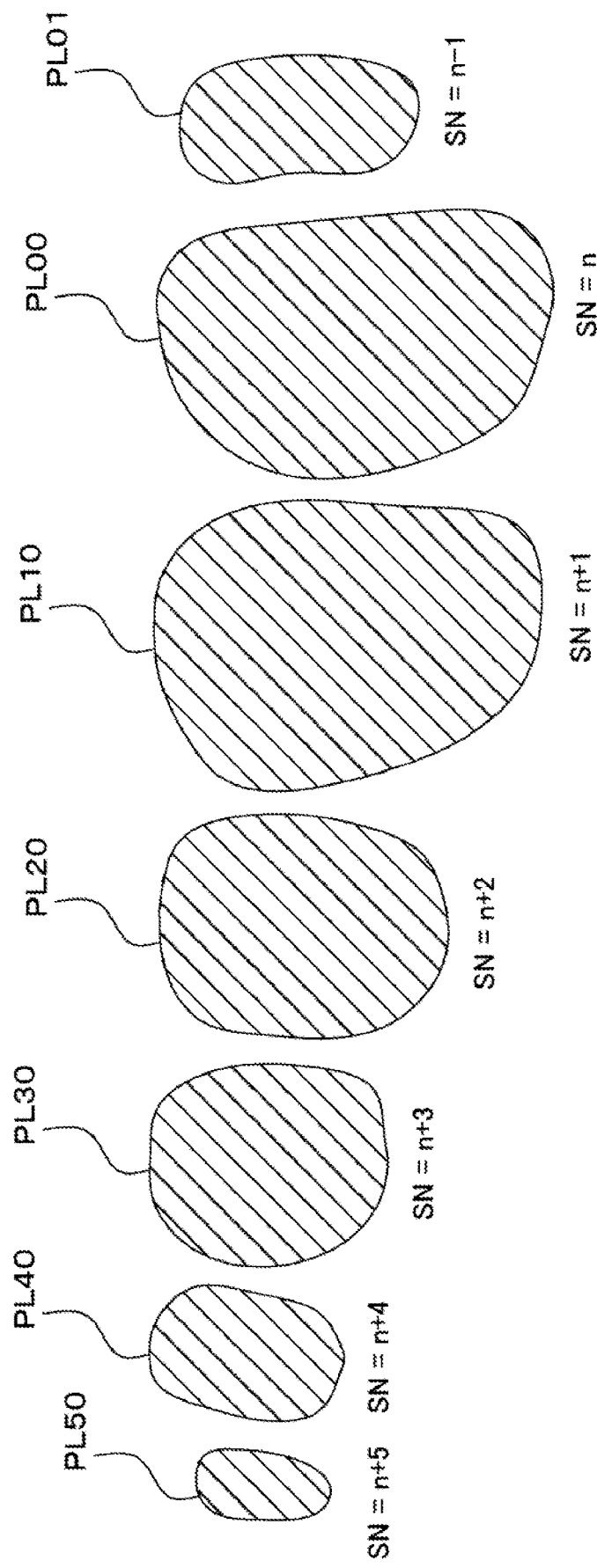
FIG. 8 is a view illustrating processing of the contour image data generating module of the signal processor.

FIG. 8 is a view schematically illustrating a state where the contours (PL01, PL00, PL10, PL20, PL30, PL40, and PL50) of the target object TY extracted in the respective slice planes SS having the slice number SN of n−1 to n+5 are lined up. The contour image data generating module 11 may then extract the contour PL00 of the target object TY in the slice plane SS of the slice number SN=n. Then, the contour image data for displaying the contour PL00 on the display unit 5 may be generated.

The contour image data generating module 11 may then generate the contour image data of the target object TY for the slice plane SS adjacent to the slice plane SS of the slice number SN=n. That is, the contour image data generating module 11 may generate the contour image data of the target object TY for the slice plane SS of the slice number SN=n−1 and the slice plane SS of the slice number SN=n+1.

In the generating processing of the contour image data of the target object TY in the slice plane SS of the slice number SN=n−1 adjacent to the slice plane SS of the slice number SN=n, the contour image data generating module 11 may first determine whether the echo signal of the target object TY is detected in the slice plane SS of the slice number SN=n−1. For example, in the slice plane SS of the slice number SN=n−1, the contour image data generating module 11 determines whether the echo signal of the target object is detected in the coordinates of at least one of the sampling points in the area where the target object TY exists in the slice plane SS of the slice number SN=n. Note that the coordinates may be set as coordinates in the slice plane SS of the slice number SN=n−1, which are located at the same depth and the same distance in the direction of the distance r as at least one of the sampling points in the area where the target object TY exists in the slice plane SS of the slice number SN=n. If the echo signal of the target object is detected at the coordinates, the contour image data generating module 11 may determine that the echo signal of the target object TY is detected in the slice plane SS of the slice number SN=n−1. Then, the binary coded processing, the expansion and contraction processings, the labeling processing, and the contour extraction processing may be performed for the slice plane SS of the slice number SN=n−1. Thus, a contour PL01 of the target object TY in the slice plane SS of the slice number SN=n−1 may be extracted, and the contour image data thereof may be generated. Note that, in the labeling processing of the slice plane SS of the slice number SN=n−1, the ID number same as the ID number assigned to the target object TY in the slice plane SS of the slice number SN=n may also be assigned to the target object TY in the slice plane SS of the slice number SN=n−1.

Note that, as described above, the contour image data generating module 11 may extract a contour PL00 of the target object TY in the first reception space RS1 corresponding to the slice plane SS of the slice number SN=n, which is one of the plurality of reception spaces RS, as the first contour. Then, if the first contour is extracted, and the echo signal of the target object TY is detected also in the second reception space RS2 corresponding to the slice plane SS of the slice number SN=n−1, adjacent to the first reception space RS1 which is one of the plurality of reception spaces RS, the contour PL01 of the target object TY of which the echo signal is detected in the second reception space RS2 may be extracted as the second contour. Then, the contour image data for displaying the contour PL00 as the first contour and the contour PL01 as the second contour on the display unit 5 may be generated.

In the generating processing of the contour image data of the target object TY in the slice plane SS of the slice number SN=n+1 adjacent to the slice plane SS of the slice number SN=n, the processing similar to the generation processing described above for the contour image data of the target object TY in the slice plane SS of the slice number SN=n−1 may be performed. Thus, it may be determined that the echo signal of the target object TY is detected also in the slice plane SS of the slice number SN=n+1, and for the slice plane SS of the slice number SN=n+1, the binary coded processing, the expansion and contraction processings, the labeling processing, and the contour extraction processing may be performed. Therefore, the contour PL10 of the target object TY in the slice plane SS of the slice number SN=n+1 may be extracted, and the contour image data thereof may be generated. Note that, in the labeling processing of the slice plane SS of the slice number SN=n+1, the ID number same as the ID number assigned to the target object TY in the slice plane SS of the slice number SN=n may be assigned also to the target object TY in the slice plane SS of the slice number SN=n+1.

As described above, when the processing to generate the contour image data of the target object TY in the slice plane SS (the slice plane SS of the slice number SN=n−1 or n+1) adjacent to the slice plane SS of the slice number SN=n is performed, the processing to generate the contour image data of the target object TY may be performed also to the slice plane SS adjacent to each of the slice plane SS (the slice planes SS of the slice number SN=n−1 and n+1). Moreover, at this time, for the slice plane SS for which the processing to generate the contour image data of the target object TY has not yet been performed, among the slice planes SS adjacent to each slice plane SS (the slice planes SS of the slice number SN=n−1 and n+1), the processing to generate the contour image data of the target object TY may be performed.

The slice plane SS adjacent to the slice plane SS of the slice number SN=n−1 may become the slice plane SS of the slice number SN=n and n−2. Among these, if there is no target object TY left in the slice plane SS of the slice number SN=n for which the processing to generate the contour image data has not yet been performed, the above processing may not be performed. For example, since the processing to generate the contour image data of the target object TY in the slice plane SS of the slice number SN=n−2 has not yet been performed, the processing may be performed for this slice plane SS. In the generating processing of the contour image data of the target object TY in the slice plane SS of the slice number SN=n−2, the processing similar to the generating processing of the contour image data of the target object TY in the slice plane SS of the slice number SN=n−1 described above may be performed. However, as illustrated in FIG. 7, the echo signal of the target object TY is not detected in the slice plane SS of the slice number SN=n−2. Therefore, for the slice plane SS of the slice number SN=n−2, the contour of the target object TY may not be extracted, and the generation of the contour image data of the target object TY may not be performed, either. In addition, for the slice plane SS of the slice number SN=n−2, since the echo signal of the target object TY is not detected, the processing to generate the contour image data of the target object TY will not be performed for the slice plane SS adjacent to the slice plane SS of the slice number SN=n−2.

The slice planes SS adjacent to the slice plane SS of the slice number SN=n+1 may be the slice planes SS of slice number SN=n and n+2. Among these, in the slice plane SS of the slice number SN=n, if there is no target object TY for which the processing to generate the contour image data has not yet been performed, the above processing may not be performed. On the other hand, since the processing to generate the contour image data of the target object TY has not yet been performed for the slice plane SS of the slice number SN=n+2, the processing to generate the contour image data of the target object TY may be performed for this slice plane SS.

In the generating processing of the contour image data of the target object TY in the slice plane SS of the slice number SN=n+2 adjacent to the slice plane SS of the slice number SN=n+1, the processing similar to the generation processing of the contour image data of the target object TY in the slice planes SS of the slice number SN=n−1 and n+1 described above may be performed. Thus, it may be determined that the echo signal of the target object TY is detected also in the slice plane SS of the slice number SN=n+2, and the binary coded processing, the expansion and contraction processings, the labeling processing, and the contour extraction processing are performed for this slice plane SS. Therefore, the contour PL20 of the target object TY in the slice plane SS of the slice number SN=n+2 may be extracted, and the contour image data thereof may be generated.

As described above, the processing to generate the contour image data of the target object TY may be repeatedly performed also in the adjacent slice plane SS until the echo signal of the target object TY is no longer detected in the adjacent slice plane SS. Thus, the generating processing of the contour image data of the target object TY performed for the slice plane SS of the slice number SN=n+2 may be performed also for each slice plane SS of the slice number SN=n+3, n+4, and n+5. Then, the processing similar to the processing performed for the slice plane SS of the slice number SN=n−2 may be performed also for the slice plane SS of the slice number SN=n+6. Therefore, the contours PL30, PL40, and PL50 of the target object TY in each slice plane SS of the slice number SN=n+3, n+4 and n+5 may be extracted, and the contour image data thereof may be generated. For the slice plane SS of the slice number SN=n+6, the contour of the target object TY may not be extracted, and therefore, the generation of the contour image data of the target object TY may not be performed. Moreover, for the slice plane SS of the slice number SN=n+6, since the echo signal of the target object TY is not detected, the processing to generate the contour image data of the target object TY will not be performed for the slice plane SS adjacent to the slice plane SS of the slice number SN=n+6. Note that, in the labeling processing for each slice plane SS of the slice number SN=n+2, n+3, n+4, and n+5, the ID number same as the ID number assigned to the target object TY in the slice plane SS of the slice number SN=n may be assigned also to the target object TY in each slice plane SS of the slice number SN=n+2, n+3, n+4, and n+5.

As described above, the contour image data generating module 11 may repeatedly perform the processing to extract the second contour subsequently to the first contour until the echo signal of the target object is no longer detected in the second reception space RS2 adjacent to the first reception space RS1 corresponding to the slice plane SS where the contour is extracted. For example, if the reception space RS corresponding to the slice number SN=n+1 is the first reception space RS1, and the reception space RS corresponding to the slice number SN=n+2 is the second reception space RS2, the contour PL10 as the first contour and the contour PL20 as the second contour are extracted, and the contour image data thereof are generated. In this case, the reception space RS where the contour PL20 is extracted as the second contour (the reception space RS corresponding to the slice plane SS of the slice number SN=n+2) may be set as a new first reception space RS1. Then, the extraction of the contour PL30 of the target object TY may be performed in the second reception space RS2 adjacent to the new first reception space RS1 (the reception space RS corresponding to the slice plane SS of the slice number SN=n+3). Thus, the contour PL20 as the new first contour and the contour PL30 as the new second contour may be extracted, and the contour image data thereof may be generated. Such processing may be repeatedly performed until the echo signal of the target object is no longer detected in the new second reception space RS2 adjacent to the new first reception space RS1.

After the contour image data generating module 11 generates the contour image data of the target object selected by the user as described above, the generated contour image data may be outputted to the display unit 5. Then, the contour of the target object selected by the user may be displayed on the display screen of the display unit 5. Before the contour of the target object is displayed, the three-dimensional image of the target object may be displayed on the display unit 5 based on the three-dimensional image data generated by the three-dimensional image data generating module 10. For example, as illustrated in FIG. 4, the three-dimensional image IM1 including the three-dimensional images of the target objects (T1, T2, and T3) is displayed. In this state, when the contour image data generating module 11 generates the contour image data of the target object selected by the user, the contour of that target object may be displayed so as to be superimposed on the three-dimensional image IM1.

Figure 9:
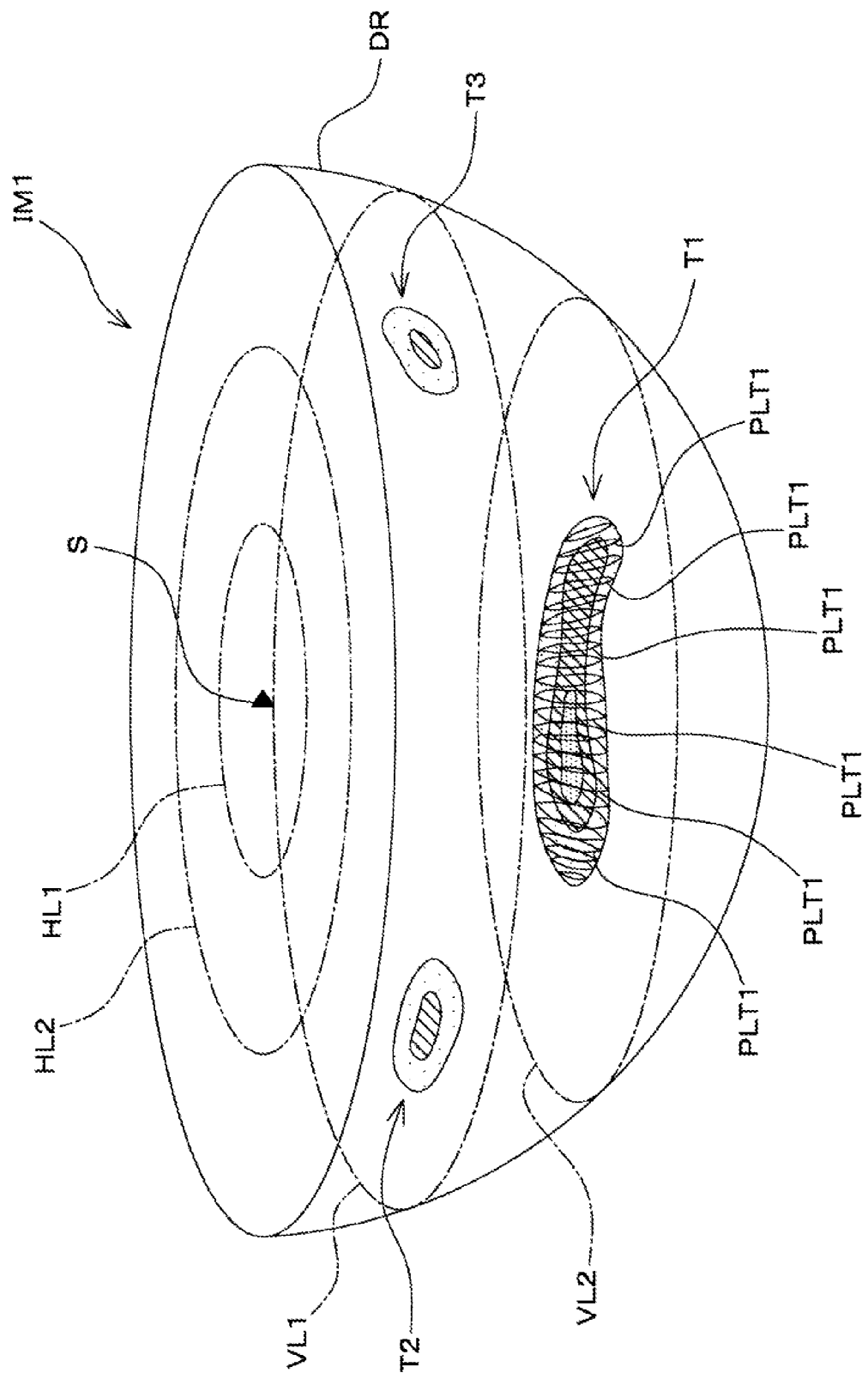
FIG. 9 is a view schematically illustrating one example of the image displayed on the display screen of the display unit.
Figure 10:
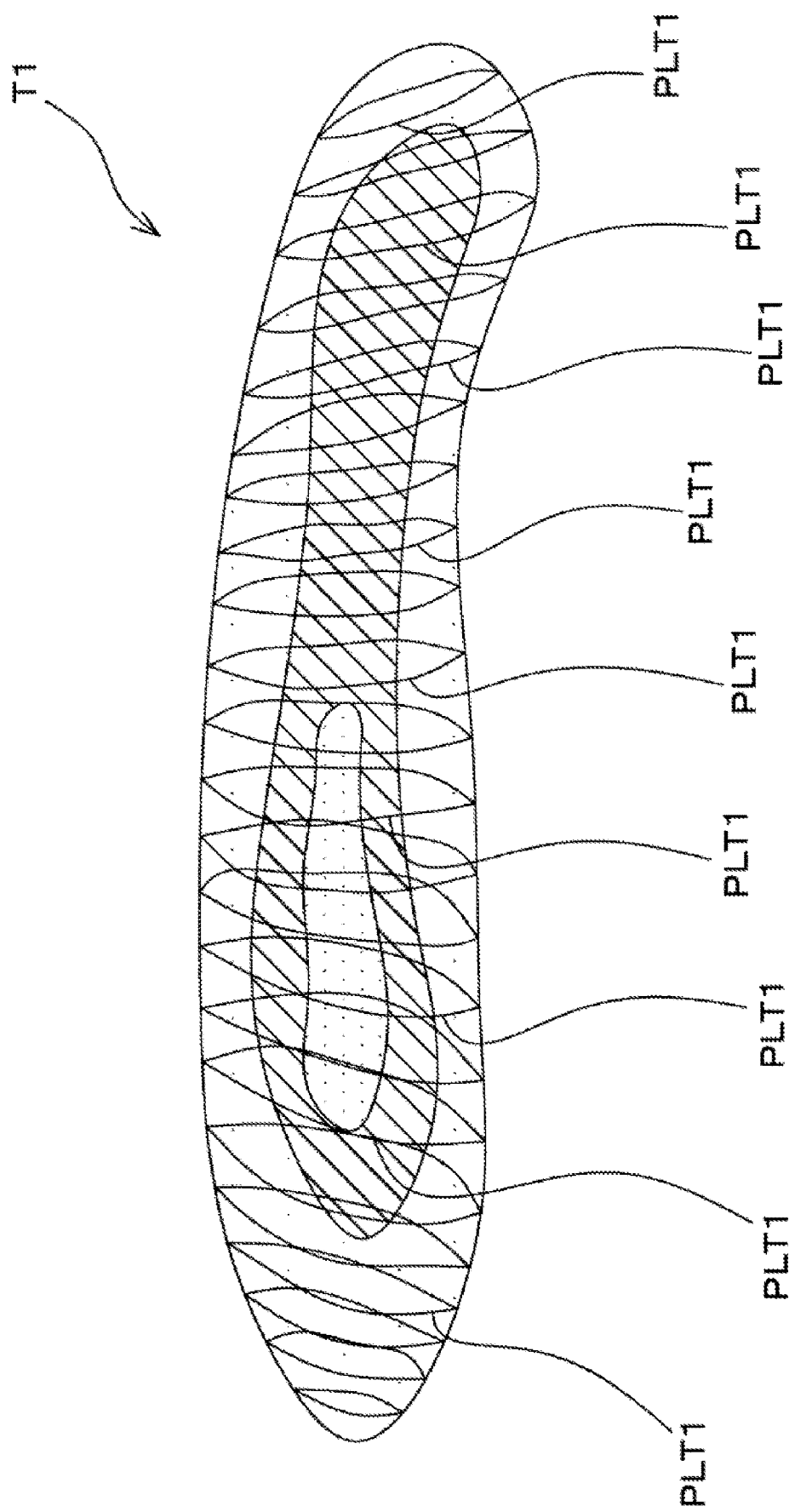
FIG. 10 is an enlarged view illustrating a part of the image illustrated in FIG. 9.

FIG. 9 is a view schematically illustrating one example of the image displayed on the display screen of the display unit 5. In FIG. 9, an image where a contour PLT1 of the target object T1 selected by the user is displayed so as to be superimposed on the three-dimensional image IM1 illustrated in FIG. 4 is schematically illustrated. FIG. 10 is an enlarged view of a part of the image illustrated in FIG. 9. In FIG. 10, a part where the contour PLT1 of a target object T1 selected by the user is superimposed on the three-dimensional image IM1 is illustrated.

An example of display of the contour of the target object is described, for example, using the state illustrated in FIG. 4 where the three-dimensional image IM1 including the three-dimensional image of the target objects (T1, T2, and T3) is displayed. In the above state of FIG. 4, the user operates the pointing device, for example, to select the target object T1 among the target objects (T1, T2, and T3). That is, the user may move the position of the cursor displayed on the display screen to a position of the target object T1, and perform a click operation of the pointing device to select the target object T1.

The contour image data generating module 11 may operate as described above to extract the contour PLT1 of the target object T1 in a plurality of slice planes SS corresponding to the plurality of space areas RS, and generate contour image data of the target object T1. The generated contour image data of the target object T1 may be outputted to the display unit 5. As illustrated in FIGS. 8 and 9, the contour PLT1 of the target object T1 is displayed in the display screen so as to be superimposed on the three-dimensional image of the target object T1 in the three-dimensional image IM1. Note that, as described above, on the display unit 5, for example, the target object T1 is displayed in red, green, and blue, and the contour PLT1 of the target object T1 is displayed in white.

Figure 11:
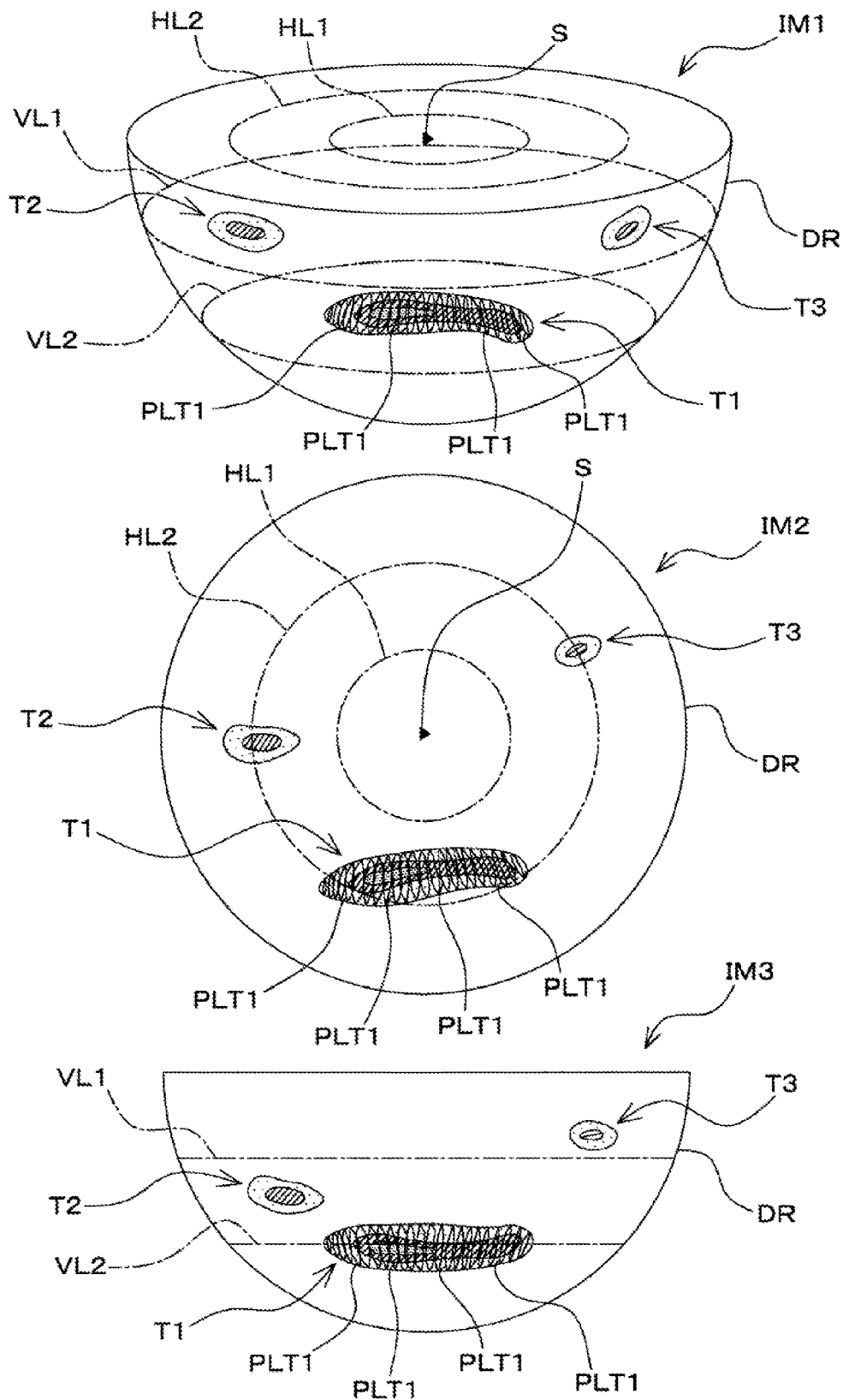
FIG. 11 is a view schematically illustrating one example of the image displayed on the display screen of the display unit.

Moreover, if the display unit 5 displays the image data of a plurality of viewpoints, when the target object in the image of one of the viewpoints is selected by the user, not only the contour of the target object selected in the viewpoint but the contour of the corresponding target objects (the same target object) in other viewpoints may be displayed based on the contour image data generated by the contour image data generating module 11. This display state where the contour PLT1 of the target object T1 is further displayed may be described using, for example, the state illustrated in FIG. 5 where the three-dimensional images (IM1, IM2, and IM3) including the three-dimensional image of the target objects (T1, T2, and T3), respectively, are displayed. FIG. 11 is a view schematically illustrating one example of the image displayed on the display screen of the display unit 5. In FIG. 11, an image where the contour PLT1 of the target object T1 selected by the user is superimposed on the three-dimensional images (IM1, IM2, and IM3) illustrated in FIG. 5 is schematically illustrated.

Before the contour PLT1 of the target object T1 is displayed, the display unit 5 may display the three-dimensional image IM1 viewed from the obliquely above viewpoint as the first viewpoint, and the three-dimensional images (IM2 and IM3) viewed from the vertical viewpoint and the horizontal viewpoint as the two second viewpoints.

In this state, for example, suppose that the target object T1 in the three-dimensional image IM1 corresponding to the first viewpoint is selected by operation of the user. The target object positional information may be then acquired by the selection of the target object T1. The contour image data generating module 11 may extract the contour PLT1 of the target object T1 based on the target object positional information, and then generate the contour image data for displaying the contour PLT1 on the display unit 5.

Then, the contour image data may be outputted to the display unit 5, as described above. As illustrated in FIG. 11, the contour PLT1 of the target object T1 is then displayed so as to be superimposed on the three-dimensional image of the target object T1 in each of the three-dimensional images (IM1, IM2, and IM3). That is, based on the contour image data, the contour PLT1 of the target object T1 may be superimposed on the three-dimensional image of the target object T1 in the first three-dimensional image IM1, and the three-dimensional image of the target object T1 in each of the two second three-dimensional images (IM2 and IM3).

In addition, the contour image data generating module 11 may acquire feature positional information (characteristic positional information) indicative of the position where the feature (characteristic) extracted from the contour image data of the target object exists. The acquisition of the feature positional information may be performed, after the target object is selected by the user, the contour of the target object may be extracted in the plurality of slice planes SS, and the contour image data of the bunch of the target objects to which the labeling processing of the same ID number is performed may be generated.

In detail, when the contour image data generating module 11 acquires the feature positional information on the target object after the generation of the contour image data of the target object, it may first specify, among the contours of the target object, each of which is extracted in the plurality of slice planes SS and for which the contour image data is generated, the slice plane SS which includes the contour with the largest area displayed based on the contour image data. Then, the contour image data generating module 11 may extract the center or the center of gravity of the largest area surrounded by the contour as the feature of the target object. Then, the contour image data generating module 11 may calculate the coordinates of the center position or the center-of-gravity position of the largest area to acquire the calculated coordinates as the feature positional information. That is, the contour image data generating module 11 may extract the center or the center of gravity of the area surrounded by the largest-area contour as the feature of the target object, from the contour image data of the target object. Then, the contour image data generating module 11 may acquire the coordinates of the center position or the center-of-gravity position of the largest area as the feature positional information indicative of the position of the feature. Note that, when calculating the coordinates, the coordinates may be corrected based on the position of the ship S detected by a GNSS receiver (not illustrated) mounted on the ship S.

When the beam forming processing is performed by the beam forming module 9 after the generation of the contour image data, the contour image data generating module 11 may again extract the contour of the target object including the position corresponding to the feature positional information acquired as described above to newly generate the contour image data. In detail, after the target object is selected by the user and the contour image data of the target object is generated, the contour image data generating module 11 may acquire the feature positional information each time the beam forming processing is performed by the beam forming module 9 and the update of the three-dimensional image data of the target object is performed by the three-dimensional image data generating module 10. Then, the contour image data generating module 11 may extract the contour of the target object including the position corresponding to the feature positional information, and generate the updated contour image data. Thus, after the target object is once selected by the user, the contour image data generating module 11 may acquire the feature positional information, and based on the feature positional information, extract the contour of the target object and update the contour image data of the target object, each time the echo signal of the target object is detected and the three-dimensional image data of the target object is updated. Note that, when the contour image data generating module 11 extracts the contour of the target object based on the feature positional information and generates the contour image data, processing similar to when extracting the contour of the target object based on the target object positional information acquired based on the operation of the user and generating the contour image data, may be performed.

[Configuration of Target Object Volume Calculation Module]

The target object volume calculation module 13 may calculate a volume of the target object, for example, based on the contour of the target object extracted by the contour image data generating module 11. When the volume of the target object is calculated by the target object volume calculation module 13, the contour of the target object may be first extracted by the contour image data generating module 11 as the first contour in the first reception space RS1 which is one of the plurality of reception spaces RS. That is, the first contour as the contour of the target object in the slice plane SS corresponding to the first reception space RS1 may be extracted. Further, the contour of the target object may be extracted by the contour image data generating module 11 as the second contour also in the second reception space RS2 which is one of the plurality of reception spaces RS and is adjacent to the first reception space RS1. That is, the second contour as the contour of the target object in the slice plane SS corresponding to the second reception space RS2 may be extracted. Then, the target object volume calculation module 13 may calculate the volume of the target object based on an area delimited by the first contour and an area delimited by the second contour.

Here, the first reception space RS1 from which the first contour is extracted and the second reception space RS2 from which the second contour is extracted may be extracted from all the reception spaces RS where the echo signals of the target objects to which the same ID number is given by the labeling processing are detected.

The target object volume calculation module 13 may calculate the volume of the target object based on the area delimited by the first contour and the area delimited by the second contour, for example, as follows.

The target object volume calculation module 13 may first identify all the reception spaces RS where the echo signals of the target objects which are target objects for which the volumes are to be calculated and to which the same ID number is given by the labeling processing are detected. Then, the target object volume calculation module 13 may set the first reception space RS1 and the second reception space RS2, and further set the area delimited by the first contour and the area delimited by the second contour, for all the reception spaces RS. The target object volume calculation module 13 may then calculate the volume of the target object between the area delimited by the first contour in the target object and the area delimited by the second contour. Here, the target object volume calculation module 13 may calculate the volume of the area between the slice plane SS where the first contour is extracted and the slice plane SS where the second contour is extracted, and the area may exist between the area delimited by the first contour and the area delimited by the second contour (hereinafter, this volume is referred to as a "between-contour volume").

The calculation of the between-contour volume may be performed for all the reception spaces RS where the echo signals of the target objects to which the same ID number is given are detected. Thus, all the between-contour volumes of all the reception spaces RS where the echo signals of the target objects are detected may be added up. In this way, the volumes of the areas corresponding to all the sampling points at which the echo signals of the target objects to which the same ID number is given by the labeling processing are detected may be added up. By adding up all the between-contour volumes, the volume of the target object may be calculated.

Note that, in the calculation of the between-contour volume, volume areas VC which are areas each existing between the area delimited by the first contour and the area delimited by the second contour, and are comprised of a plurality of cells corresponding respectively to all the sampling points at which the echo signals of the target objects are detected, may be set. For example, each volume area VC is set as an area where the sampling point corresponding to the volume area VC is used as one vertex.

Figure 12:
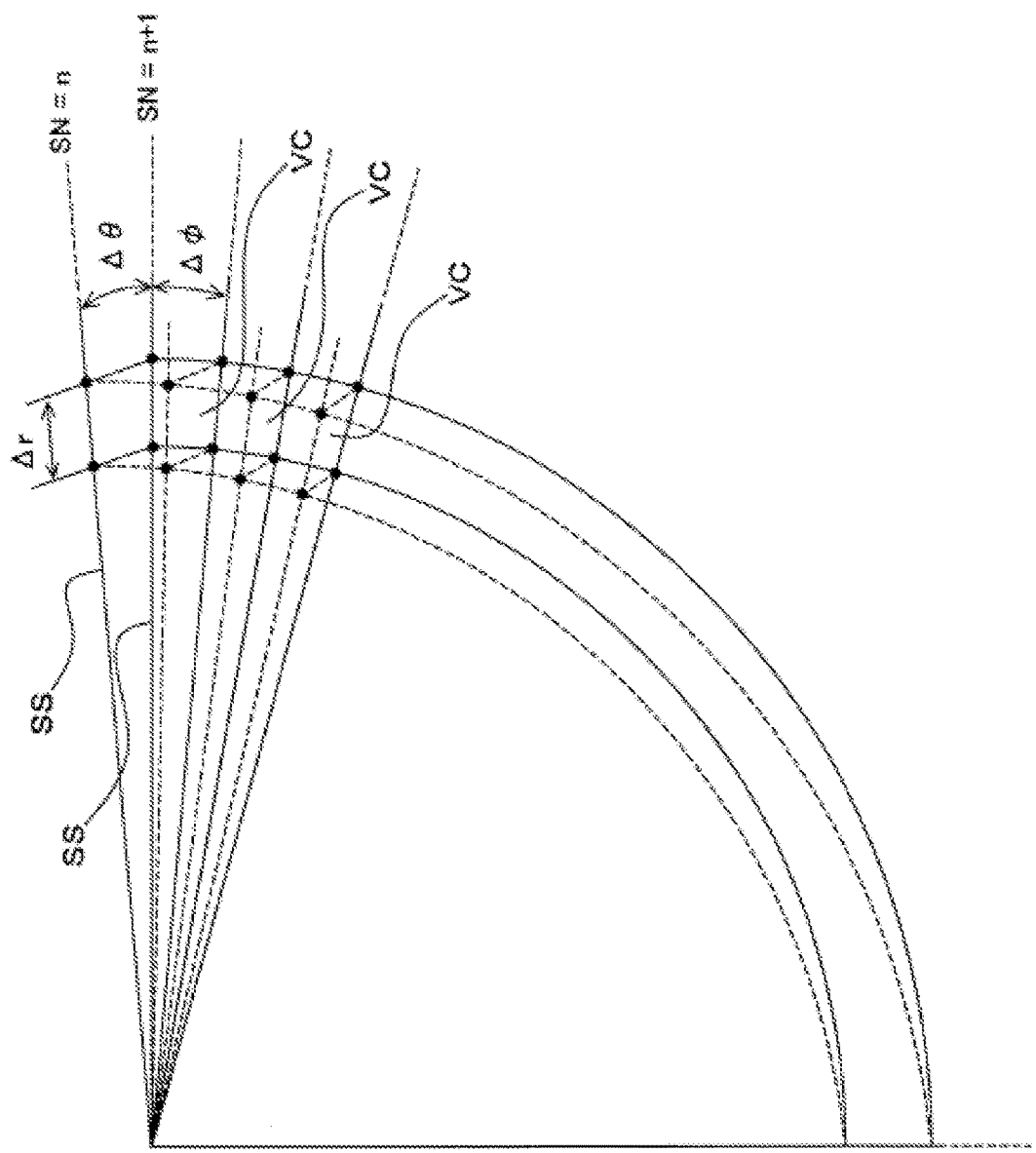
FIG. 12 is a view illustrating processing of a target object volume calculation module of the signal processor.

FIG. 12 is a view illustrating processing of the target object volume calculation module 13, where the volume areas VC are schematically illustrated. In FIG. 12, a case where the reception space RS including the slice plane SS of the slice number SN=n is set as the first reception space RS1, and the reception space RS including the slice plane SS of the slice number SN=n+1 is set as the second reception space RS2, is illustrated. In addition, in FIG. 12, the first contour is extracted in the slice plane SS of the slice number SN=n, and the second contour is extracted in the slice plane SS of the slice number SN=n+1. Note that, FIG. 12 is a view schematically illustrating the volume areas VC, where illustration of the first contour and the second contour is omitted. Each volume area VC of the cell corresponding to the sampling point at which the echo signal of the target object is detected may exist between the adjacent slice planes SS and between the area delimited by the first contour and the area delimited by the second contour. Each volume area VC may be set as an area having widths corresponding to intervals between the adjacent sampling points in the directions of the azimuth angle θ, the distance r, and the tilt angle φ. In FIG. 12, the width in the direction of the azimuth angle θ of the volume area VC is Δθ, the width in the direction of the distance r of the volume area VC is Δr, and the width in the direction of the tilt angle φ of the volume area VC is Δφ.

In the calculation of each between-contour volume, the target object volume calculation module 13 may first calculate the volume of the volume area VC of the cell corresponding to each sampling point at which the echo signal of the target object is detected. In detail, the volume of the volume area VC may be calculated by calculating the integral, from the position of the sampling point corresponding to each volume area VC, over the width Δθ in the direction of the azimuth angle θ, Δr in the direction of the distance r, and Δφ in the direction of the tilt angle φ. Thus, the target object volume calculation module 13 may add up the volumes of the volume areas VC respectively corresponding to all the sampling points, each of which exists between the area delimited by the first contour and the area delimited by the second contour, and where the echo signals of the target objects are detected. Thus, the between-contour volumes may be calculated. Then, the target object volume calculation module 13 may calculate the volume of the target object by adding up all the between-contour volumes which are calculated for all the reception spaces RS where the echo signals of the target object are detected.

Figure 13:
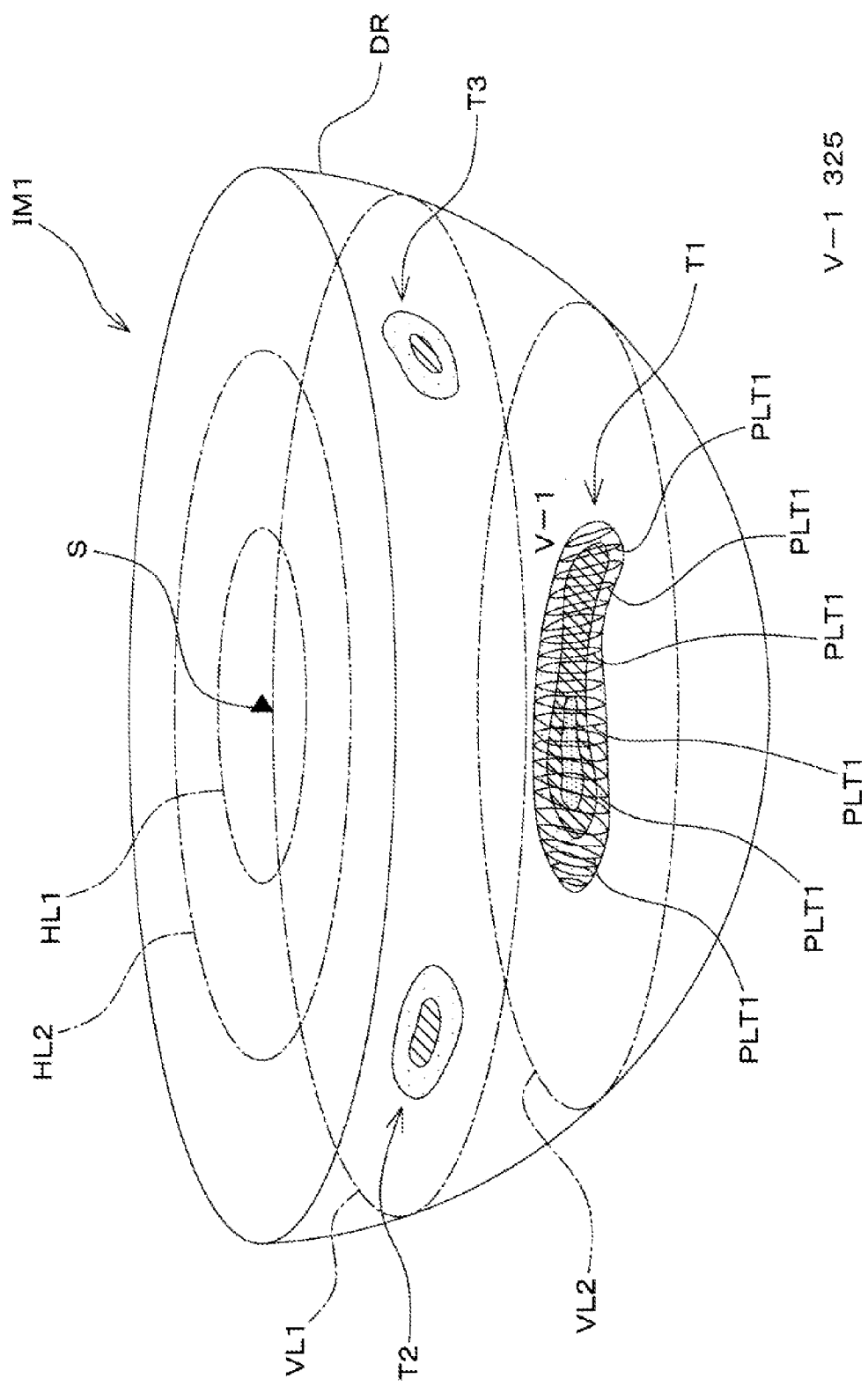
FIG. 13 is a view schematically illustrating one example of the image displayed on the display screen of the display unit.

The target object volume calculation module 13 may then generate volume display data for displaying a value indicating the calculated target object volume on the display unit 5, and output it to the display unit 5. The display unit 5 may display the volume value of the target object based on the volume display data. FIG. 13 is a view schematically illustrating one example of the image displayed on the display screen of the display unit 5. In FIG. 13, an image where the volume value of the target object T1 is superimposed on the three-dimensional image IM1 illustrated in FIG. 9 is schematically illustrated.

The display unit 5 may define, based on the inputted volume display data, for example, 1000 m$^3$ as a unit volume, and display the volume of the target object T1. In FIG. 13, the volume of the target object T1 may be indicated as 325 units. Note that, as illustrated in FIG. 13, for example, a notation of "V−1" indicative of the target object of which the volume is to be displayed is displayed near this target object T1, and a notation of "V−1 325" is displayed apart from the three-dimensional image IM1. Thus, the user can grasp the rough volume value of a school of fish indicated by the target object T1 by displaying on the display unit 5 the volume of the target object T1 calculated by the target object volume calculation module 13.

Note that, although, in the above, the particular calculation method of the volume of the target object by the target object volume calculation module 13 is described, the volume of the target object may also be calculated by other methods.

For example, the volume of the target object can also be calculated without being based on the contour of the target object. In detail, in all the reception spaces RS where the target object of which the volume is to be calculated and to which the same ID number is given by the labeling processing is detected, the volume of the target object can also be calculated by adding up all the volumes of the volume areas VC respectively corresponding to all the sampling points at which the target object is detected.

Alternatively, the volume of the target object can also be calculated without calculating the between-contour volumes. For example, the volume of the target object can also be calculated by calculating the volume of the area surrounded by each contour for every slice plane SS where the contour of the target object is extracted, and adding up all the volumes of the areas for all the slice planes SS. In this case, it may be considered that the area surrounded by the contour has the thickness of $\Delta\theta/2$ on both sides of the slice plane SS in the direction of the azimuth angle $\theta$, and the volume of the area surrounded by the contour is calculated based on this consideration. Then, the volume of the target object can be calculated by adding up all the volumes of the areas surrounded by the contours for all the slice planes SS.

[Operation of Underwater Detection Apparatus]

Figure 14:
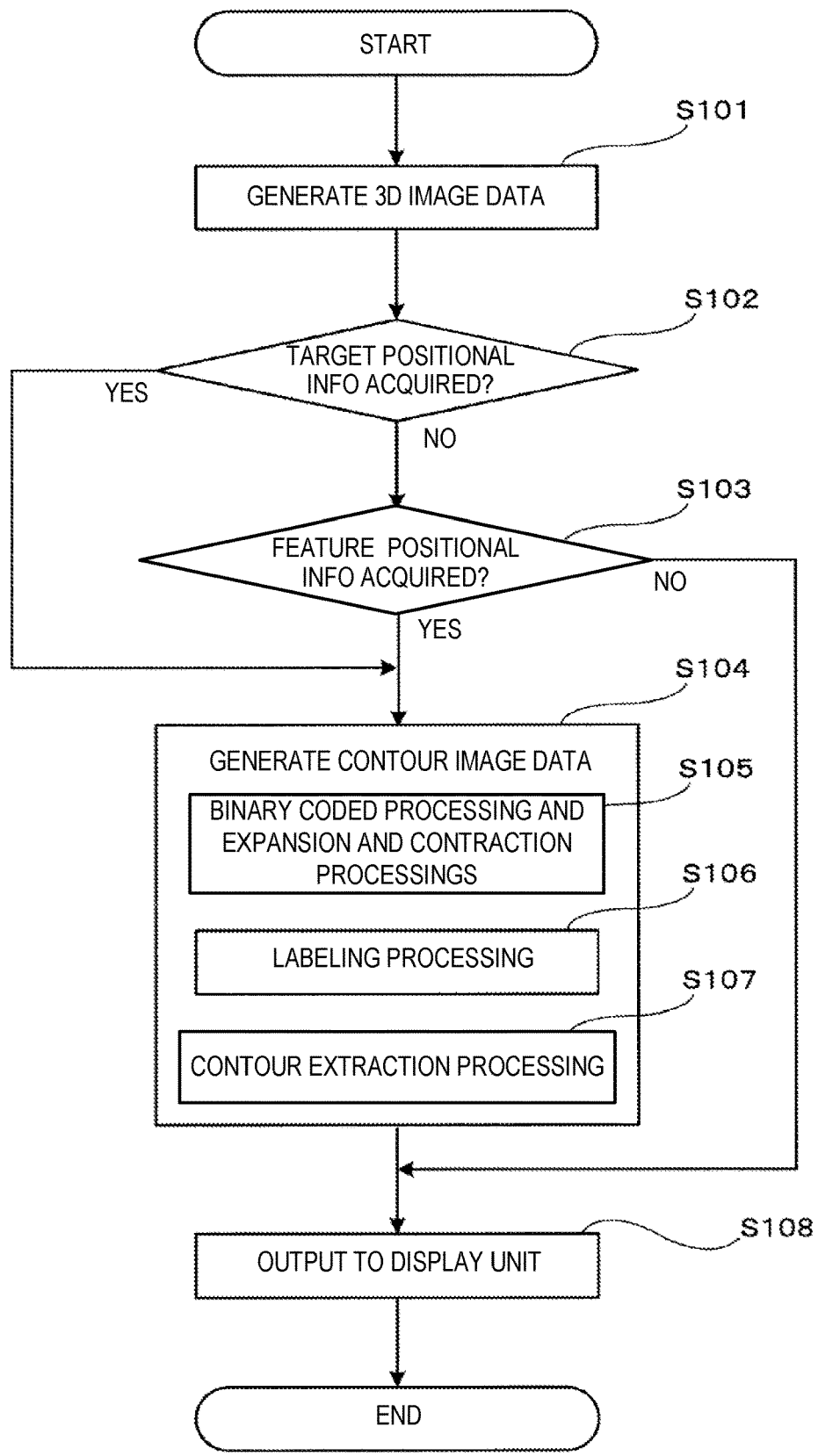
FIG. 14 is a flowchart illustrating operation of the underwater detection apparatus.

FIG. 14 is a flowchart illustrating one example of operation of the underwater detection apparatus 1. In FIG. 14, operation in which the transmission waves are transmitted underwater from the transducer 2 and the reflection waves of the transmission waves are received by the transducer 2, and further, the processing described above is performed by the underwater detection apparatus 1, and the three-dimensional image of the target object and the image of the contour of the target object are displayed on the display unit 5, is illustrated. After the images of the target object is displayed as described above, operation illustrated in the flowchart of FIG. 14 may be again performed when the transmission waves are transmitted underwater from the transducer 2.

In the operation of the underwater detection apparatus 1, transmission waves may be first transmitted to the underwater transmission space TS from the transducer 2. The transmission wave transmitted to the underwater transmission space TS may be reflected on the underwater target object and the corresponding reflection wave may be received by the transducer 2. The plurality of receiving elements of the transducer 2 may generate reception signals based on the reflection waves including the reflection of the transmission wave on the underwater target object, and output them to the transmitter/receiver 3. The transmitter/receiver 3 may amplify the received reception signals and remove the unnecessary frequency components in the reception circuit 7, convert them into digital signals, and output the digital signals to the signal processor 4.

When the reception signals are inputted from the transmitter/receiver 3, the signal processor 4 may perform, in the beam forming module 9, the beam forming processing and the filtering processing for each of the plurality of reception spaces RS based on the reception signals, and detect the echo signals of the target object in each reception space RS. Then, the three-dimensional image data generating module 10 may generate, based on the result of the beam forming processing performed for each reception space RS, the three-dimensional image data of the target object for displaying the target object on the display unit 5 (Step S101).

Then, it may be determined whether the target object positional information is acquired (Step S102). That is, the contour image data generating module 11 may determine whether one of the target objects is selected by the operation of the user and the positional information acquisition module 12 acquires the target object positional information.

Note that, when the underwater detection apparatus 1 is activated to start the operation, and the underwater detection apparatus 1 performs the operation illustrated in FIG. 14 for the first time, the three-dimensional image of the target object may not be displayed on the display unit 5. Therefore, in such a case, the selection of the target object may not be performed by the user, and the acquisition of the target object positional information by the positional information acquisition module 12 may not be performed, either. Thus, the contour image data generating module 11 may determine that the target object positional information is not acquired (Step S102, No), and further determine whether the feature positional information is acquired (Step S103). When the operation illustrated in FIG. 14 of the underwater detection apparatus 1 is performed for the first time, the contour image data generating module 11 may have not yet performed the generating processing of the contour image data at all, and have not acquired the feature positional information, either. Therefore, the contour image data generating module 11 may determine that the feature positional information is not acquired (Step S103, No). Then, the three-dimensional image data generated by the three-dimensional image data generating module 10 may be outputted to the display unit 5 (Step S108). On the display unit 5, the three-dimensional image of the target object may be displayed as illustrated in FIG. 4 or 5 based on the inputted three-dimensional image data. Thus, the first-time operation illustrated in FIG. 14 is once finished.

Also in the operation illustrated in FIG. 14 performed for the second and subsequent times, it may be determined at Step S102 whether the target object positional information is acquired. If determined that the target object positional information is not acquired (Step S102, No), the determination of Step S103 may be performed. On the other hand, if determined that the target object positional information is acquired (Step S102, Yes), the contour image data generating module 11 may extract the contour of the target object, and perform the processing to generate the contour image data for displaying the contour on the display unit 5 (Step S104). Note that, in the operation illustrated in FIG. 14 performed for the second and subsequent times, it may be determined at Step S102 whether the target object positional information has been acquired after the previous operation.

If determined that the target object positional information is not acquired (Step S102, No), and if determined that the feature positional information is not acquired (Step S103, No), the three-dimensional image data generated by the three-dimensional image data generating module 10 may be outputted to the display unit 5 (Step S108). On the other hand, if determined that the target object positional information is not acquired (Step S102, No), and if determined that the feature positional information is acquired (Step S103, Yes), the contour image data generating module 11 may extract the contour of the target object, and perform the processing to generate the contour image data for displaying the contour on the display unit 5 (Step S104). Note that, as described above, after the contour image data generating module 11 extracts the contour of the target object based on the target object positional information and generates the contour image data, it may generate the contour image data, and acquire the feature positional information, each time the operation illustrated in FIG. 14 is performed. Therefore, after the selection of the target object is performed by the user, it may be determined at Step S103 that the feature positional information is acquired (Step S103, Yes).

At Step S104, the contour of the target object of which the echo signal is detected in at least one reception space RS may be extracted, and the contour image data for displaying the contour on the display unit 5 may be generated. That is, at Step S104, as described above, the contour image data generating module 11 may generate the contour image data in each of the plurality of reception spaces RS where the echo signal of the target object including the position corresponding to the target object positional information or the feature positional information is detected. At this time, the contour image data generating module 11 may perform, for each of the plurality of reception spaces RS, the binary coded processing and the expansion and contraction processings (Step S105), the labeling processing (Step S106), and the contour extraction processing (Step S107). Thus, the contour image data generating module 11 may generate, for the plurality of reception spaces RS, the contour image data of the bunch of the target objects to which the labeling processing is performed with the same ID number.

At Step S104, the generated contour image data may be outputted to the display unit 5 (Step S108). Moreover, at Step S108, the three-dimensional image data generated by the three-dimensional image data generating module 10 may also be outputted to the display unit 5. As illustrated in FIG. 9 or 11, the display unit 5 displays the image of the contour of the target object together with the three-dimensional image of the target object. Thus, the operation illustrated in FIG. 14 is once finished. Once the operation illustrated in FIG. 14 is finished, the transmission wave may be transmitted to the underwater transmission space TS from the transducer 2, and the operation illustrated in FIG. 14 is again started.

[Effects]

According to this embodiment, the three-dimensional image of the target object may be displayed on the display unit 5 based on the three-dimensional image data of the target object generated by the three-dimensional image data generating module 10. Further, according to this embodiment, the contour of the target object can also be displayed on the display unit 5 so as to be superimposed on the three-dimensional image of the target object based on the contour image data generated by the contour image data generating module 11. Therefore, also in the two-dimensional screen on the display unit 5, the user can easily distinguish the target objects, such as schools of fish, one from another, displayed by the three-dimensional image, and can easily recognize the target object.

Therefore, according to this embodiment, the underwater detection apparatus and the underwater detection method can be provided, by which the user can easily distinguish the target objects one from another displayed by the three-dimensional image, and can easily recognize the target object.

Moreover, according to this embodiment, the contour image data generating module 11 may set the display color information of the contour image data as the display color information different from the display color information of the three-dimensional image data of the target object. Therefore, the user can easily distinguish the three-dimensional image of the target object and the image of its contour one from another, and can more easily recognize the target object.

Moreover, according to this embodiment, when the contour of the target object is extracted in the first reception space RS1, and the echo signal of the target object is detected also in the second reception space RS2 adjacent to the first reception space RS1, also the contour of the target object in the second reception space RS2 may be extracted, and the contour image data may be then generated. Therefore, according to this embodiment, also for the target object which exists over the plurality of adjacent reception spaces RS, the contour image data can be generated by extracting the contour corresponding to the same target object in the plurality of reception spaces RS.

Moreover, according to this embodiment, the processing to extract the contour in each reception space RS may be repeatedly performed until the echo signal of the target object is no longer detected in the second reception space RS2 adjacent to the first reception space RS1 from which the contour is extracted. Therefore, according to this embodiment, also for the target object which exists over the plurality of reception spaces RS lined up adjacently and continuously, the contour image data can be generated by extracting the contour corresponding to the same target object in the plurality of reception spaces RS.

Moreover, according to this embodiment, any one of the reception spaces RS and another reception space RS may differ in the azimuth angle θ along which each reception space RS is formed in the horizontal plane. Therefore, the contour of the target object can be extracted in the plurality of reception spaces RS which spreads in the different directions of the azimuth angle θ.

Moreover, according to this embodiment, the target object volume calculation module 13 can calculate the volume of the target object based on the area delimited by the first contour in the first reception space RS1 and the area delimited by the second contour in the second reception space RS2. Therefore, the volume of the target object can easily be calculated based on the contour extracted by the contour image data generating module.

Moreover, according to this embodiment, the target object positional information may be acquired based on the selecting operation of the target object by the user, and the contour image data generating module may then extract the contour of the target object including the position corresponding to the target object positional information, and generate the contour image data. Therefore, according to this embodiment, the user can easily display the contour of the desired target object by selecting the target object of which the contour is to be displayed.

Moreover, according to this embodiment, when the target object positional information is acquired by the target object displayed from the first viewpoint (e.g., the obliquely above viewpoint) being selected by the user, the contour image data generating module 11 may extract the contour of the target object, and generate the contour image data. Then, the display unit 5 may display the contour of the target object so as to be superimposed on the target object displayed from the first viewpoint and the target object displayed from the second viewpoint (e.g., the vertical viewpoint and/or the horizontal viewpoint) based on the contour image data. Therefore, the user can observe the same target object with the contour being displayed simultaneously in the multiple viewpoints only by selecting the target object displayed in one viewpoint.

Moreover, according to this embodiment, the contour image data generating module 11 may once extract the contour of the target object according to the selection of the target object by the user, and generate the contour image data, and after that, it may acquire the feature positional information on the target object. Then, when the beam forming processing is performed by the beam forming module 9 after the generation of the contour image data, the contour image data generating module 11 may extract the contour of the target object including the position corresponding to the feature positional information, and newly generate the contour image data. Therefore, according to this embodiment, after the user once selects the target object, the contour of the selected target object may be automatically displayed for every update of the three-dimensional image of the target object, without the user performing an additional operation.

[Modifications]

As described above, although the embodiment of the present disclosure is described, the present disclosure is not limited to the above embodiment, and various changes may be made to the embodiment without departing from the spirit of the present disclosure.

(1) In the above embodiment, although the transducer functions as the transmitting transducer and also functions as the receiving transducer, the configuration may be altered. For example, the transmitting transducer and the receiving transducer may be provided separately from each other.

(2) In the above embodiment, although the scanning sonar forms the transmission beams all at once in all the underwater azimuth directions centering on the ship, the configuration may be altered. For example, a searchlight sonar (PPI sonar) which rotates a transmission beam and a reception beam may be provided, instead of the scanning sonar.

(3) In the above embodiment, although one reception space is directed to a different azimuth angle from another reception space, the configuration may be altered.

For example, one reception space may be directed to a different angle of inclination (i.e., the tilt angle) from another reception space. In this case, one reception space and another reception space may be formed as reception spaces each spreading in an umbrella shape from the position of the ship.

Alternatively, one reception space may be located at a different distance from another reception space with respect to the position of the receiving transducer. In this case, one reception space and another reception space may be formed as reception spaces each spreading in a hemisphere shell shape at a different distance from the position of the ship.

(4) In the above embodiment, although the target object volume calculation module calculates the volume of the target object based on the contour extracted by the contour image data generating module, the configuration may be altered. For example, the target object volume calculation module may not be provided to the underwater detection apparatus.

(5) In the above embodiment, although the volume of the target object of a school of fish selected by the user is calculated, information other than the volume of the target object may also be calculated. In this case, for example, an average intensity, which is an average value of the signal intensity levels of the echo signals included in the target object of a school of fish selected by the user, may be calculated. Alternatively, an azimuth angle of the reception space where an echo signal of the target object of a school of fish selected by the user with the highest signal intensity level exists may be calculated. Alternatively, a tilt angle of the position of the center of gravity of the target object of a school of fish selected by the user may be calculated. Alternatively, a range of the tilt angle within which the target object of a school of fish selected by the user exists may be calculated. Alternatively, a distance of the position of the center of gravity of the target object of a school of fish selected by the user from the ship may be calculated. Alternatively, a range of the distance from the ship within which the target object of a school of fish selected by the user exists may be calculated. Alternatively, a depth of the position of the center of gravity of the target object of a school of fish selected by the user from the water surface may be calculated. Alternatively, a range of the depth within which the target object of a school of fish selected by the user exists from the water surface may be calculated. Alternatively, a surface area of the area where the target object of a school of fish selected by the user exists may simply be calculated. Alternatively, a degree of spherical shape which is a degree of approximation when approximating the target object of a school of fish to a spherical shape may further be calculated for the target object of a school of fish selected by the user, based on the calculation results of the volume of the target object and the surface area of the area where the target object exists.

(6) In the above embodiment, although the positional information acquisition module is provided, and the target object volume calculation module calculates the volume of the target object selected by the user, the configuration may be altered. For example, like a modification illustrated in FIG. 15, the underwater detection apparatus may calculate the volume of all the target objects of which the echo signals are detected, and select the target object for which the contour is to be displayed based on the calculated volume of the target object. Below, the underwater detection apparatus according to the modification may be described with reference to FIG. 15.

Figure 15:
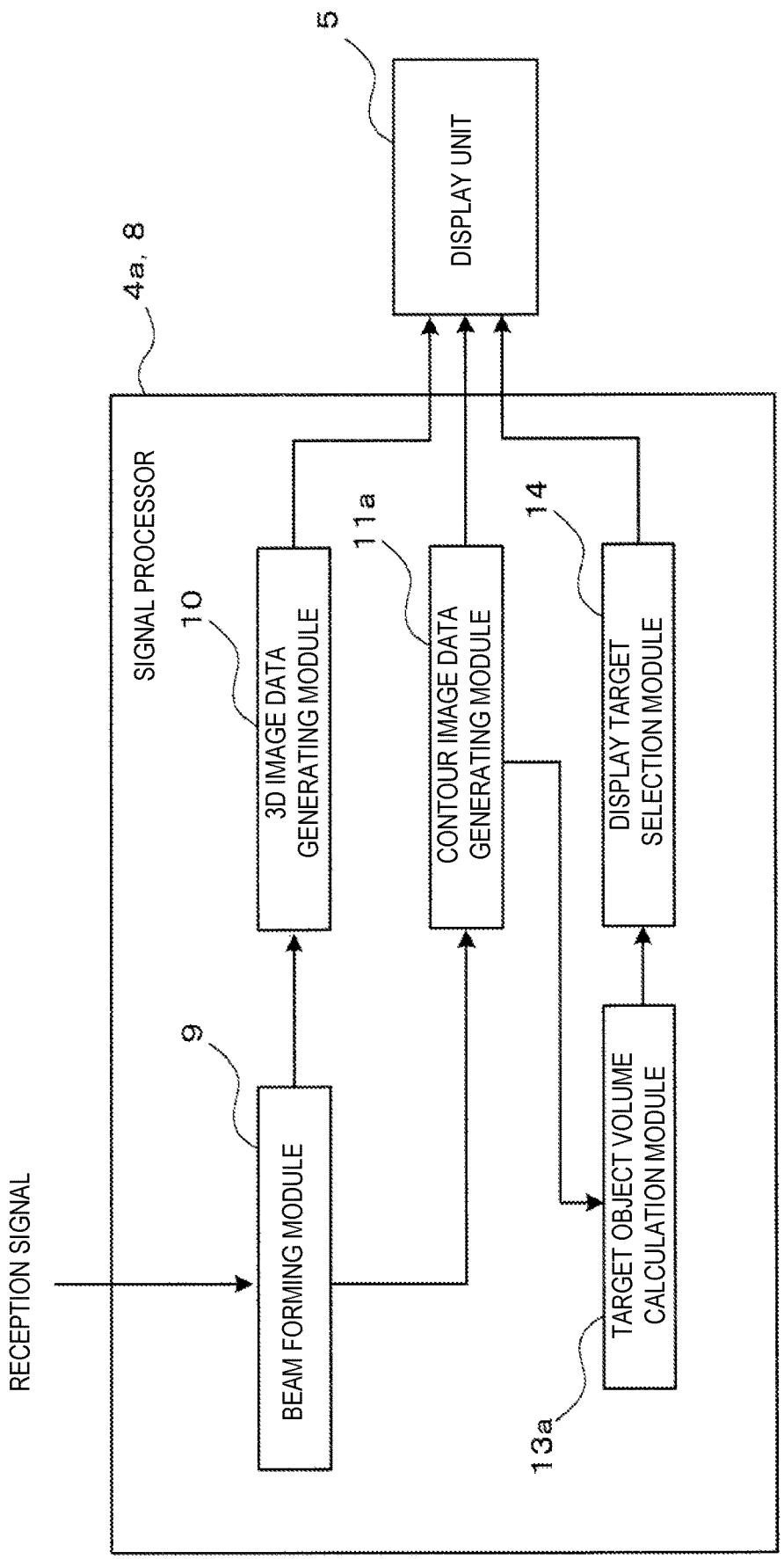
FIG. 15 is a block diagram illustrating a configuration of a signal processor of the underwater detection apparatus according to one modification.

FIG. 15 is a block diagram illustrating a configuration of a signal processor 4a of the underwater detection apparatus according to the modification. The underwater detection apparatus according to this modification may be configured similarly to the underwater detection apparatus 1 of the above embodiment, except for the configuration of the signal processor 4a. Note that, in the following description, only differences of the signal processor 4a according to this modification from the signal processor 4 of the above embodiment are described. Moreover, similar components of this modification to the components of the above embodiment are denoted with the same reference characters in the drawing or description to omit redundant description.

The signal processor 4a may include the beam forming module 9, the three-dimensional image data generating module 10, a contour image data generating module 11a, a target object volume calculation module 13a, and a display target selection module 14.

The contour image data generating module 11 of the above embodiment may generate the contour image data of the target object selected by the user. On the other hand, the contour image data generating modules 11a of this modification may extract the contours of all the target objects, and generate the contour image data of all the contours. That is, the contour image data generating module 11a may extract the contours of all the target objects of which the echo signals are detected by the beam forming module 9 in the plurality of reception spaces RS, and generate the contour image data.

Moreover, in this modification, the target object volume calculation module 13a may calculate the volumes of all the target objects based on the echo signals of the target objects detected in the plurality of reception spaces RS. Note that the target object volume calculation module 13 of the above embodiment may calculate the volume of the target object which is selected by the user and of which the contour is extracted by the contour image data generating module 11. On the other hand, the target object volume calculation module 13a of this modification may calculate the volumes of all the target objects of which the contours are extracted by the contour image data generating module 11a. That is, the target object volume calculation module 13a may calculate the volumes of all the target objects of which the echo signals are detected in the plurality of reception spaces RS.

Note that various methods may be used for the way to calculate the volume of each target object by the target object volume calculation module 13a. For example, the target object volume calculation module 13a may calculate the volume of the target object by the same method as the target object volume calculation module 13 of the above embodiment. Alternatively, the target object volume calculation module 13a may calculate the volume of the target object by other methods described in the above embodiment. For example, the target object volume calculation module 13a may calculate the volumes for every target object to which the same ID number is given by the labeling processing. In this case, the volume of each target object to which the same ID number is given may be calculated by adding up all the volumes of the volume areas VC respectively corresponding to all the sampling points at which the target objects are detected. Alternatively, the target object volume calculation module 13a may calculate the volume of each target object by calculating the volume of the area surrounded by the corresponding contour for every slice plane SS from which the contour is extracted, and adding up all the volumes of the areas surrounded by the contours for all the slice planes SS.

The display target selection module 14 may select some of all the contour image data generated by the contour image data generating module 11a as candidates be displayed on the display unit 5. Then, the display target selection module 14 may select the contour image data as the candidates be displayed, based on the volume of the target object calculated by the target object volume calculation module 13a. In more detail, for example, the display target selection module 14 may compare all the volumes calculated by the target object volume calculation module 13a for all the target objects of which the echo signals are detected by the beam forming module 9, and create a list of the volumes in descending order. Then, the display target selection module 14 may select the contour image data as the candidates to be displayed, based on a given number of display target objects, for example, set by the operational input of the user. That is, the display target selection module 14 may select the contour image data as the candidates to be displayed so that the contours of the given number of target objects are displayed on the display unit 5 from the target object with the largest volume in the list.

The three-dimensional image data generated by the three-dimensional image data generating module 10, the contour image data generated by the contour image data generating module 11a, and the selection result of the contour image data as the candidates to be displayed which is selected by the display target selection module 14, may be outputted to the display unit 5. The display unit 5 may display the three-dimensional image of all the target objects of which the echo signals are detected based on the input of the signal processor 4a described above, and display the contours of the target objects which are some of the displayed target objects and are selected by the display target selection module 14 so as to be superimposed on the corresponding target objects. Therefore, on the display unit 5, only the contours of the given number of target objects from the target object with the largest volume may be displayed among the displayed target objects.

According to this modification, even if the operation to select the target object is not performed by the user, the target objects of which the contours are to be displayed may be selected automatically based on the volume of the target object, and the contours of the selected target objects may be displayed. Therefore, the user can easily grasp the contours of the target objects of schools of fish with large volumes, and can further easily recognize the target objects of the schools of fish with the large volumes. Moreover, according to this modification, since the contours of schools of fish with small volumes are not displayed, the user can easily make an adequate decision when he/she determines whether the school of fish is to be caught because a school of small fish should not be caught, for example, from viewpoints of the resource management.

(7) In the above embodiment, after the user once selects the target object, the contour of the selected target object is automatically displayed for every update of the three-dimensional image of the target object, without the user performing an additional operation. However, due to fluctuation of the reflection wave received by the transducer 2 of the underwater detection apparatus, there is a possibility that a target object is not detected on two successive updates. For example, a target object detected on a current update $U_n$ was not detected on an update $U_{n-1}$ coming before the update $U_n$, but was detected on an update $U_{n-2}$ coming before update $U_{n-1}$. In such case, during the update $U_n$, the contour image data generating module 11 may extract the contour of the target object including the position corresponding to the feature positional information acquired during update $U_{n-2}$.

According to this modification, even if the target object is not detected on successive updates, the target object is still automatically detected, without the user performing an additional operation.

The present disclosure may widely be applicable to the underwater detection apparatus for detecting the underwater target object.

Terminology

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controlling module, microcontrolling module, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controlling module, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow views described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface." The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated," and other such relational terms should be construed, unless otherwise noted, to include removable, moveable, fixed, adjustable, and/or releasable connections or attachments. The connections/attachments can include direct connections and/or connections having intermediate structure between the two components discussed.

Numbers preceded by a term such as "approximately," "about," and "substantially" as used herein include the recited numbers, and also represent an amount close to the stated amount that still performs a desired function or achieves a desired result. For example, the terms "approximately," "about," and "substantially" may refer to an amount that is within less than 10% of the stated amount. Features of embodiments disclosed herein are preceded by a term such as "approximately," "about," and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. An underwater detection apparatus, comprising:
 a transmission transducer configured to transmit a transmission wave in an underwater transmission space;
 a reception transducer comprising a plurality of reception elements, each reception element generating a reception signal based on a reflection wave comprising a reflection of the transmission wave on an underwater target that is different from a sea floor and at a depth shallower than the sea floor; and
 processing circuitry configured to:
  perform beamforming in each of a plurality of reception spaces based on the reception signals;
  generate a 3D image data of the target based on the beamforming performed in each reception space; and
  extract a contour of the target detected in at least one of the reception spaces, and generate a contour image data to be displayed along with the 3D image data on a display unit; and after the contour image data has been generated:
acquire a feature positional information that represents an information on a position of a feature extracted from the contour image data of the target;
extract the contour of the target containing a position corresponding to the feature positional information when the beamforming is performed after the contour image data is generated; and
generate the contour image data one more time.

2. The underwater detection apparatus of claim 1, wherein:
the 3D image data and the contour image data comprise display color information to be displayed on the display unit; and
the processing circuitry is further configured to set the display color information of the contour image data to a different display color information from the display color information of the 3D image data.

3. The underwater detection apparatus of claim 1, wherein:
when a first contour is extracted as the contour of the target detected in a first reception space of the plurality of reception spaces, if the target is also detected in a second reception space of the plurality of reception spaces adjacent to the first reception space, the processing circuitry is further configured to extract a second contour as the contour of the target detected in the second reception space, and generate the contour image data of the first and second contours to be displayed on the display unit.

4. The underwater detection apparatus of claim 3, wherein:
the processing circuitry is further configured to repeat the first contour extraction followed by the second contour extraction process until the target is not detected any more in the second reception space adjacent to the first reception space in which the contour has been extracted.

5. The underwater detection apparatus of claim 3, wherein:
the processing circuitry is further configured to calculate a volume of the target based on an area delimited by the first contour in the first reception space and an area delimited by the second contour in the second reception space.

6. The underwater detection apparatus of claim 1, wherein:
a reception space of the plurality of reception spaces differs from another reception space of the plurality of reception spaces, different from the reception space, in one of:
an azimuth angle of the reception space and the another reception space relative to a vertical plane,
an inclination angle of the reception space and the another reception space relative to a horizontal plane, and
a distance of the reception space and the another reception space from the reception transducer.

7. The underwater detection apparatus of claim 1, wherein the processing circuitry is further configured to:
acquire a target positional information that represents an information on a position of the target based on an input from an operation of a user of the underwater detection apparatus that selected the target; and
extract the contour of the target containing a position corresponding to the target positional information.

8. The underwater detection apparatus of claim 1, wherein:
each reception space of the plurality of reception spaces is a subspace of the transmission space.

9. The underwater detection apparatus of claim 1, wherein the processing circuitry is further configured to:
extract the contour of all the targets whose echo signals are detected in the plurality of reception spaces and generate the contour image data;
calculate a volume of all the targets based on the echo signal of the targets detected in the plurality of reception spaces; and
select a part of all the generated contour image data as a display target to be displayed on the display unit based on a size of the calculated volume of the target.

10. The underwater detection apparatus of claim 1, wherein:
the underwater target is a school of fish.

11. An underwater detection method, comprising:
transmitting a transmission wave in an underwater transmission space;
generating from each reception element of a plurality of reception elements a reception signal based on a reflection wave comprising a reflection of the transmission wave on an underwater target that is different from a sea floor and at a depth shallower than the sea floor;
performing beamforming in each of a plurality of reception spaces based on the reception signals;
generating a 3D image data of the target based on the beamforming performed in each reception space; and
extracting a contour of the target detected in at least one of the reception spaces, and generating a contour image data to be displayed along with the 3D image data on a display unit; and
after the contour image data has been generated:
acquiring a feature positional information that represents an information on a position of a feature extracted from the contour image data of the target;
extracting the contour of the target containing a position corresponding to the feature positional information when the beamforming is performed after the contour image data is generated; and
generating the contour image data one more time.

12. The underwater detection method of claim 11, wherein:
the underwater target is a school of fish.

13. The underwater detection method of claim 11, wherein:
the 3D image data and the contour image data comprise display color information to be displayed on the display unit; and
the method further comprises setting the display color information of the contour image data to a different display color information from the display color information of the 3D image data.

14. The underwater detection method of claim 11, wherein:
when a first contour is extracted as the contour of the target detected in a first reception space of the plurality of reception spaces, if the target is also detected in a second reception space of the plurality of reception spaces adjacent to the first reception space, the method further comprises extracting a second contour as the contour of the target detected in the second reception space, and generating the contour image data of the first and second contours to be displayed on the display unit.

15. The underwater detection method of claim 14, further comprising:
repeating the first contour extracting followed by the second contour extracting until the target is not detected any more in the second reception space adjacent to the first reception space in which the contour has been extracted.

16. The underwater detection method of claim 14, further comprising:
calculating a volume of the target based on an area delimited by the first contour in the first reception space and an area delimited by the second contour in the second reception space.

17. The underwater detection method of claim 11, wherein:
a reception space of the plurality of reception spaces differs from another reception space of the plurality of reception spaces, different from the reception space, in one of:
an azimuth angle of the reception space and the another reception space relative to a vertical plane,
an inclination angle of the reception space and the another reception space relative to a horizontal plane, and
a distance of the reception space and the another reception space from the reception transducer.

18. The underwater detection method of claim 11, further comprising:
acquiring a target positional information that represents an information on a position of the target based on an input from an operation of a user of an underwater detection apparatus that selected the target; and
extracting the contour of the target containing a position corresponding to the target positional information.

19. The underwater detection method of claim 11, wherein:
each reception space of the plurality of reception spaces is a subspace of the transmission space.

* * * * *